United States Patent
Ko et al.

(10) Patent No.: US 10,950,937 B2
(45) Date of Patent: Mar. 16, 2021

(54) DEVICE AND METHOD FOR CONTROLLING BEAM BY USING LENS IN WIRELESS COMMUNICATION SYSTEM

(71) Applicant: Samsung Electronics Co., Ltd., Suwon-si (KR)

(72) Inventors: Seungtae Ko, Suwon-si (KR); Yoongeon Kim, Suwon-si (KR); Hyunjin Kim, Suwon-si (KR); Jinsu Heo, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/381,379

(22) Filed: Apr. 11, 2019

(65) Prior Publication Data

US 2019/0319355 A1    Oct. 17, 2019

(30) Foreign Application Priority Data

Apr. 11, 2018  (KR) .......................... 10-2018-0042115

(51) Int. Cl.
*H01Q 3/26* (2006.01)
*H01Q 25/00* (2006.01)
(Continued)

(52) U.S. Cl.
CPC ............ *H01Q 3/2658* (2013.01); *H01Q 3/32* (2013.01); *H01Q 3/38* (2013.01); *H01Q 3/46* (2013.01);
(Continued)

(58) Field of Classification Search
CPC ...... H04B 7/0617; H04B 7/0695; H04B 7/04; H04B 7/0413; H04B 7/00; H01Q 19/062;
(Continued)

(56) References Cited

U.S. PATENT DOCUMENTS 8,754,810 B2 *  6/2014  Guo .................... H01Q 3/36
                                                342/368
8,933,840 B2 *  1/2015  Hosoya ................ H01Q 3/267
                                                342/373
(Continued)

FOREIGN PATENT DOCUMENTS

KR    10-2017-0108365 A    9/2017
KR    10-2018-0096287 A    8/2018
KR    10-2018-0096362 A    8/2018

OTHER PUBLICATIONS

Jiang et al.; Metamaterial-Based Thin Planar Lens Antenna for Spatial Beamforming and Multibeam Massive MIMO; IEEE Transactions on Antennas and Propagation; vol. 65, No. 2; Feb. 2017.
(Continued)

*Primary Examiner* — Vibol Tan
(74) *Attorney, Agent, or Firm* — Jefferson IP Law, LLP

(57) ABSTRACT

The disclosure relates to a pre-5th-Generation (5G) or 5G communication system for supporting higher data rates beyond $4^{th}$-Generation (4G) communication system such as long term evolution (LTE). The beamforming device in a wireless communication system may include an antenna array, a communicator configured to perform beamforming of the antenna array by applying a phase pattern for forming a plurality of beams, and a lens configured to adjust phases of respective incident signals by using the plurality of beams and emit output signals, wherein the lens includes unit cells corresponding to the phase pattern. Accordingly, the transmission device and method can reduce a distance between an antenna and a lens in a wireless communication system.

16 Claims, 27 Drawing Sheets

(51) Int. Cl.
*H01Q 3/32* (2006.01)
*H01Q 3/38* (2006.01)
*H04B 7/06* (2006.01)
*H01Q 3/46* (2006.01)

(52) U.S. Cl.
CPC ......... *H01Q 25/008* (2013.01); *H04B 7/0617* (2013.01)

(58) Field of Classification Search
CPC .......... H01Q 3/24; H01Q 25/008; H01Q 3/40; H01Q 3/46; H01Q 3/36; H01Q 25/00; H01Q 21/065; H01Q 3/2658; H01Q 3/30; H01Q 19/06; H01Q 1/2291; H01Q 1/241; H01Q 1/243; H04W 88/08; H04W 88/02
See application file for complete search history.

(56) References Cited

U.S. PATENT DOCUMENTS

| | | | | |
|---|---|---|---|---|
| 9,042,276 | B1* | 5/2015 | Harel | H04J 3/1694 |
| | | | | 370/277 |
| 9,083,408 | B2* | 7/2015 | Merlin | H04B 7/0619 |
| 9,368,870 | B2* | 6/2016 | Dayanandan | H01Q 3/46 |
| 2003/0011888 | A1 | 1/2003 | Cox et al. | |
| 2010/0207833 | A1 | 8/2010 | Toso et al. | |
| 2011/0199273 | A1 | 8/2011 | Kim et al. | |
| 2014/0313090 | A1 | 10/2014 | Oh et al. | |
| 2015/0009080 | A1 | 1/2015 | Oh et al. | |
| 2015/0200452 | A1 | 7/2015 | Oh et al. | |
| 2015/0288438 | A1 | 10/2015 | Maltsev et al. | |
| 2016/0240923 | A1* | 8/2016 | Oh | H01Q 19/062 |
| 2017/0077600 | A1 | 3/2017 | Maltsev et al. | |
| 2017/0271762 | A1* | 9/2017 | Ko | H01Q 21/065 |
| 2017/0332249 | A1 | 11/2017 | Guey et al. | |
| 2018/0269576 | A1* | 9/2018 | Scarborough | H01Q 3/30 |
| 2019/0181926 | A1* | 6/2019 | Liang | H04B 7/0452 |

OTHER PUBLICATIONS

International Search Report and Written Opinion dated Jul. 23, 2019; International Appln. No. PCT/KR2019/004362.

\* cited by examiner

DEVICE AND METHOD FOR CONTROLLING BEAM BY USING LENS IN WIRELESS COMMUNICATION SYSTEM

CROSS-REFERENCE TO RELATED APPLICATION(S)

This application is based on and claims priority under 35 U.S.C. 119(a) of a Korean patent application number 10-2018-0042115, filed on Apr. 11, 2018, in the Korean Intellectual Property Office, the disclosure of which is incorporated by reference herein in its entirety.

BACKGROUND

1. Field

The disclosure relates to a wireless communication system. More particularly, the disclosure relates to a device and method for controlling a beam by using a lens in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology, have been developed.

In a 5G system, a beamforming technique may be used to overcome path loss. A variety of techniques may be used together to further enhance a gain of a beam. For example, a gain amplifier using a lens may be considered. However, more efficient use of a lens is necessary in consideration of a space for lens installation, beam gain improvement by the lens, and the like.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a device and method for controlling beamforming gain by using a lens in a wireless communication system.

Another aspect of the disclosure is to provide a device and method for reducing a distance between an antenna and a lens in a wireless communication system.

Additional aspects will be set forth in part in the description which follows and, in part, will be apparent from the description, or may be learned by practice of the presented embodiments.

In accordance with an aspect of the disclosure, a beamforming device in a wireless communication system is provided. The device includes an antenna array, a communication unit or communicator configured to perform beamforming of the antenna array by applying a phase pattern for forming a plurality of beams, and a lens configured to adjust phases of respective incident signals by using the plurality of beams and emit output signals, wherein the lens includes unit cells corresponding to the phase pattern.

In accordance with another aspect of the disclosure, an operation method of a beamforming device in a wireless communication system is provided. The method includes performing beamforming of an antenna array by applying a phase pattern for forming a plurality of beams, and adjusting phases of respective incident signals by using the plurality of beams, and emitting output signals, wherein the lens includes unit cells corresponding to the phase pattern.

In accordance with another aspect of the disclosure, a device and method according to embodiments can increase a gain of a signal by increasing an area in which a beam is projected onto a lens.

In accordance with another aspect of the disclosure, a device and method according to embodiments can reduce a distance between an antenna and a lens so as to enable miniaturizing of a beamforming device including the lens.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, embodiments will be described based on an implementation of hardware. However, embodiments include a technology that uses both hardware and software and thus, the embodiments may not exclude the implementation of software.

The disclosure, hereinafter, relates to a device and method for performing beamforming through a lens in a wireless communication system. Specifically, the disclosure describes a technique for increasing a beamforming gain by increasing an area in which a beam formed in an antenna array is projected onto a lens in a wireless communication system.

Terms used in the following descriptions, such as a term referring to a signal (a symbol, a stream, data, and a beam forming signal), a term related to a beam (a multi-beam, a plurality of beams, a single beam, a dual-beam, a quad-beam, and beamforming), a term referring to network entities, a term referring to elements of a device (an antenna array, an antenna element, a communication unit or communicator, and an antenna), and the like, are illustrated for convenience of description. Accordingly, the disclosure is not limited to the following terms and other terms having the same technical meaning may be used.

The disclosure describes embodiments by using terms used in some communication specifications (e.g., 3rd generation partnership project (3GPP)), but this is merely illustrative. Embodiments may also be easily modified and applied to other communication systems.

Figure 1:
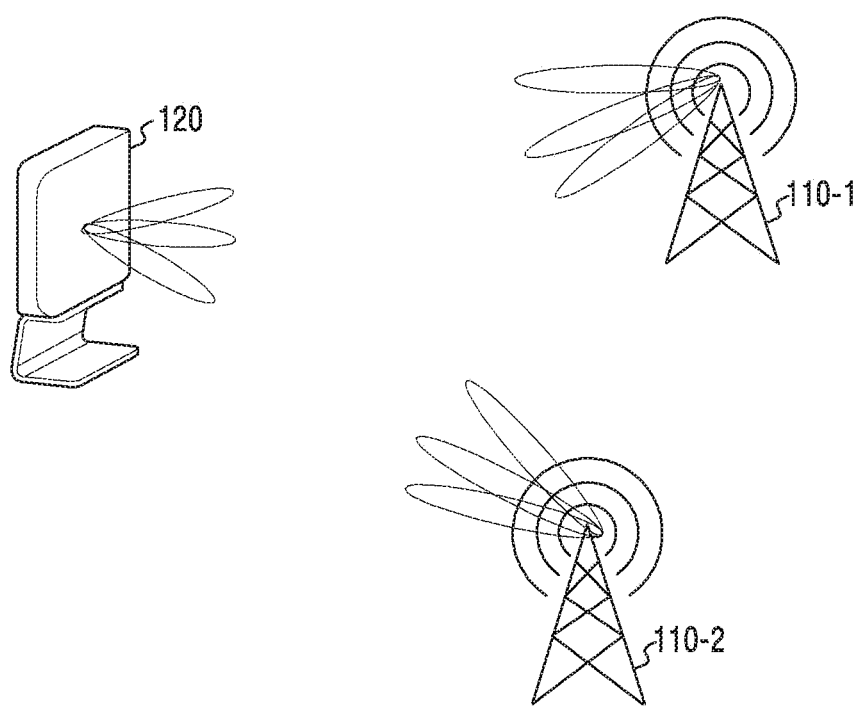
FIG. 1 illustrates a wireless communication system according to an embodiment of the disclosure.

FIG. 1 illustrates a wireless communication system according to an embodiment of the disclosure.

Referring to FIG. 1, a base station 110-1, a base station 110-2, and a terminal 120 are illustrated as nodes using a wireless channel in a wireless communication system. FIG. 1 illustrates two base stations, but may further include another base station that is the same as or similar to the base station 110-1 and the base station 110-2. FIG. 1 illustrates only one terminal, but may further include another terminal that is the same as or similar to the terminal 120.

The base station 110-1 and the base station 110-2 are network infrastructures that provide a wireless connection to the terminal 120. The base station 110-1 and the base station 110-2 have coverage defined as a particular geographic area on the basis of a distance in which a signal may be transmitted. Each of the base station 110-1 and the base station 110-2 may be referred to as, other than a base station, "an access point (AP)", "an eNodeB", "a 5G node (5th generation node), "a wireless point", a "transmission/reception point (TRP)", or other terms having equivalent technical meanings.

The terminal 120 is a device used by a user, and performs communication with the base station 110-1 and the base station 110-2 via a wireless channel. The terminal 120 may be a device having mobility or a fixed device. In some cases, the terminal 120 may be operated without user involvement. For example, the terminal 120 can be a device that performs machine type communication (MTC), and may not be carried by a user. The terminal 120 may be referred to as, in addition to a terminal, "a user equipment (UE)", "a mobile station", "a subscriber station", "a remote terminal", "a wireless terminal", "an electronic device", a "user device", "a customer premise equipment (CPE)", or other terms having equivalent technical meanings.

The base station 110-1, the base station 110-2, and the terminal 120 may transmit and receive wireless signals in a millimeter wave band (e.g., 28 GHz, 30 GHz, 38 GHz, and 60 GHz). At this time, in order to improve a channel gain, the base station 110-1, the base station 110-2, and the terminal 120 may perform beamforming. The beamforming may include transmission beamforming and reception beamforming That is, the base station 110-1, the base station 110-2, and the terminal 120 may assign a directivity to a transmission signal or a reception signal. To this end, the base station 110-1, the base station 110-2, and the terminal 120 may select serving beams via a beam search procedure or a beam management procedure. After the serving beams are selected, communication may then be performed via resources that are in quasi co-located (QCL) relationship with resources at which the serving beams are transmitted.

If it is possible to infer large-scale characteristics of a channel for transferring of a symbol on a first antenna port, from a channel for transferring of a symbol on a second antenna port, then it may be estimated that the first antenna port and the second antenna port are in a QCL relationship. For example, the large-scale characteristics may include at least one among a delay spread, a Doppler spread, a Doppler shift, an average gain, an average delay, and a spatial receiver parameter.

Figure 2:
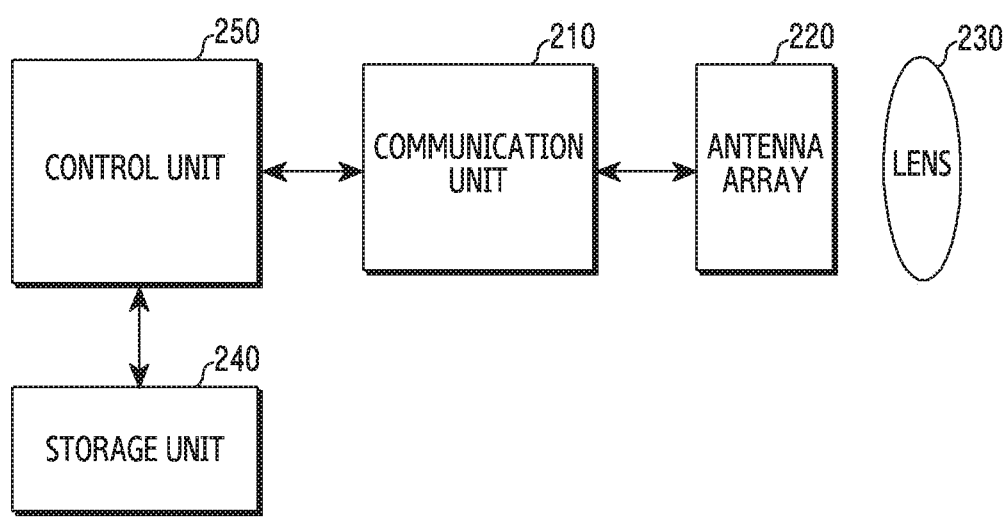
FIG. 2 illustrates a configuration of a beamforming device in a wireless communication system according to an embodiment of the disclosure.

FIG. 2 illustrates a configuration of a beamforming device in a wireless communication system according to an embodiment of the disclosure. The configuration illustrated in FIG. 2 may be understood as a configuration of the terminal 120. The term "-unit" or "-er" used hereinafter may refer to a unit for processing at least one function or operation and may be implemented using hardware, software, or a combination of hardware and software.

Referring to FIG. 2, a beamforming device includes an antenna array 220, a communicator or communication unit 210, a lens 230, a storage unit 240, and a control unit 250.

The communication unit 210 performs functions for transmitting or receiving a signal through a wireless channel. For example, the communication unit 210 performs a function of conversion between a baseband signal and a bit stream according to a physical layer standard of a system. For example, when data is transmitted, the communication unit 210 generates complex symbols by encoding and modulating a transmission bit stream. When data is received, the communication unit 210 restores a reception bit stream by demodulating and decoding a baseband signal. The wireless communication unit 210 up-converts a baseband signal into a radio frequency (RF) band signal and transmits the same through an antenna, and down-converts an RF band signal received through an antenna into a baseband signal. For example, the wireless communication unit 210 may include a transmission filter, a reception filter, an amplifier, a mixer, an oscillator, a digital to analog converter (DAC), an analog to digital converter (ADC), and the like.

The communication unit 210 may also include a plurality of transmission/reception paths. In terms of hardware, the communication unit 210 may include a digital circuit and an analog circuit (e.g., an RF integrated circuit (RFIC)). The digital circuit and the analog circuit may be implemented in a single package. The communication unit 210 may also include a plurality of RF chains. Further, the communication unit 210 may perform beamforming.

The communication unit 210 transmits and receives a signal as described above. Accordingly, all or part of the communication unit 210 may be referred to as "a transmission unit", "a reception unit", or "a transmission/reception unit". Also, transmission and reception performed through a wireless channel, which will be described in the following descriptions, may be understood to mean that the above-described processing is performed by the communication unit 210.

The antenna array 220 emits a signal generated by the communication unit 210 or receives a signal transmitted from the outside. The antenna array 220 may include a plurality of antenna elements. The directivity of a signal may be assigned based on phase values of signals transmitted through the plurality of antenna elements. That is, the antenna array 220 may perform beamforming based on the phase values. According to embodiments, signals transmitted at the antenna array 220 may be emitted through a plurality of beams corresponding to a plurality of directions.

The lens 230 is an element for adjusting a gain of a signal emitted from the antenna array 220 or a gain of a signal received from the outside. For example, the lens 230 may be a passive element in which a gain of a signal is adjusted as the signal passes therethrough. The lens 230 may also be an active element for adaptively adjusting a gain according to a signal. In some embodiments, the lens comprises an active element configured to adaptively adjust the phases of respective incident signals.

The lens 230 may include a plurality of unit cells (UCs). Specifically, the lens 230 may include a plurality of unit cells, wherein each of the plurality of unit cells has a unique dielectric rate and/or a unique shape. Here, the dielectric rate of each unit cell may be determined according to a type of material (e.g., a dielectric) that constitutes a unit cell, and a shape and size of the material (e.g., a conductor). According to the dielectric rate, a value for compensation for a phase of a component (e.g., a radio wave component) of a beam incident on a unit cell may vary. In view of an equivalent circuit, each unit cell may be interpreted as a circuit including at least one capacitor or at least one inductor. According to embodiments, the lens 230 may include a plurality of layers, and may have a variety of shapes. For example, the lens 230 may have a flat structure, i.e., a plane, may be a circular plane or a divided circular plane. As another example, the lens 230 may be in the form of a rectangle or an octagon.

The storage 240 stores data, such as configuration information, an application program, and basic programs for the operation of the beamforming device. The storage unit 240 may include a volatile memory, a non-volatile memory, or a combination of a volatile memory and a non-volatile memory. The storage unit 240 provides stored data in response to a request of the control unit 250. According to embodiments, the storage unit 240 may store a phase profile (e.g., a phase pattern) for eliminating a beam by using a lens.

The control unit 250 controls overall operations of the beamforming device. For example, the control unit 250 transmits and receives a signal via the communication unit 210. Further, the control unit 250 records data in the storage unit 240 and reads the recorded data from the storage unit. The control unit 250 may perform functions of a protocol stack required by the communication standard. To this end, the control unit 250 may include at least one processor or a micro-processor, or may be a part of a processor. A part of the communication unit 210 and the control unit 250 may be referred to as a communication processor (CP). According to embodiments, the control unit 250 may perform control so that the communication unit 210 performs beamforming by applying a phase pattern for forming (hereinafter, multi-beamforming) a plurality of beams (multi-beam). Here, the multi-beam means a plurality of beams indicating a plurality of directions, instead of a single beam in which a shape of the beam formed at beamforming indicates a single direction. For example, the control unit 250 may control the beamforming device to perform operations according to embodiments described below.

Figure 3A:
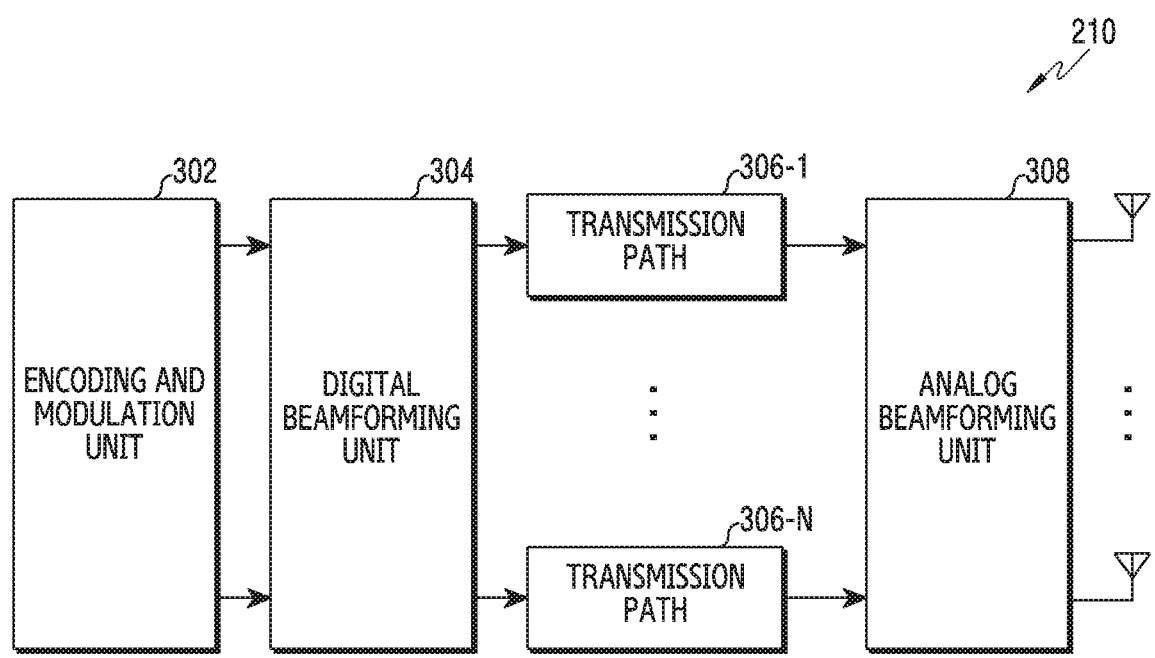
FIGS. 3A, 3B and 3C illustrate configurations of a communication system in wireless communication systems according to embodiments of the disclosure.
Figure 3B:
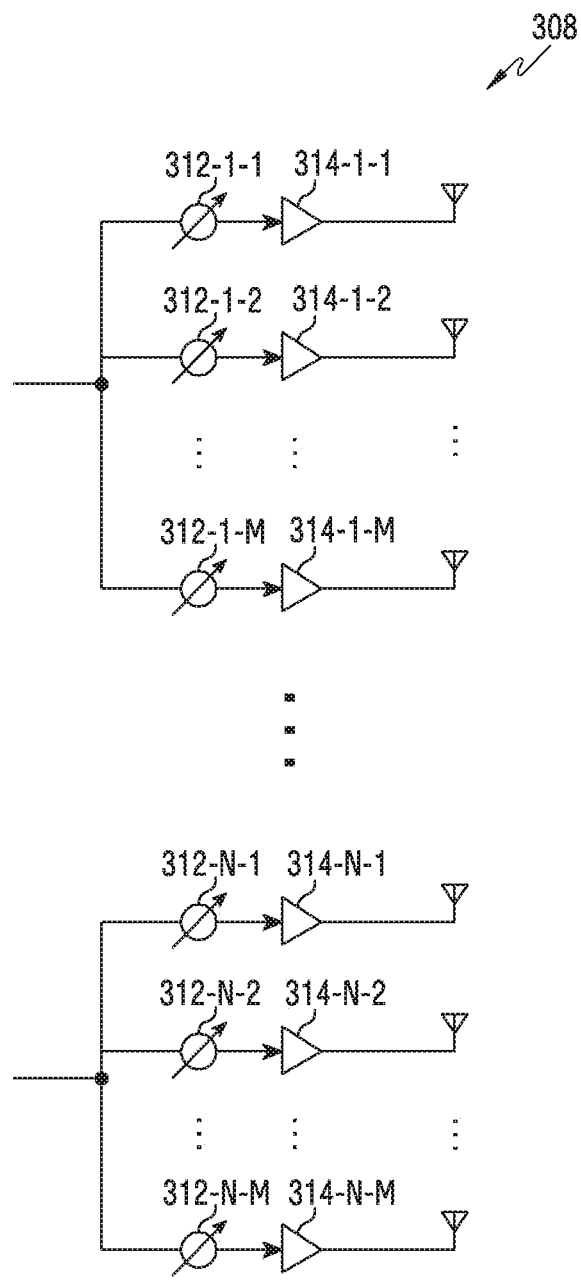
Figure 3C:
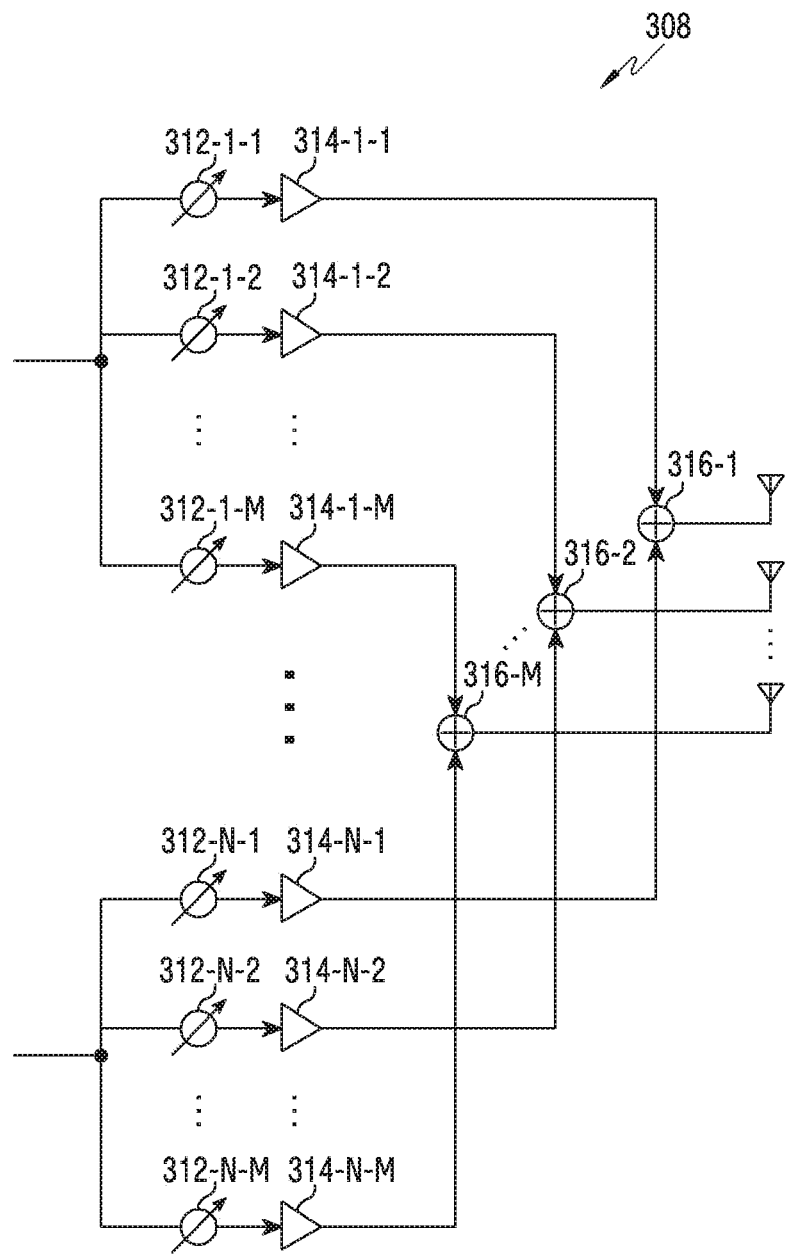

FIG. 3A illustrates a block diagram of a configuration of a communication system in a wireless communication system according to an embodiment of the disclosure. FIGS. 3B and 3C illustrate configurations of communication systems in a wireless communication system according to embodiments of the disclosure. Each of FIGS. 3A, 3B and 3C illustrate an example of detailed configurations of the communication unit 210 of FIG. 2. Specifically, each of FIGS. 3A, 3B and 3C illustrate an example of elements, as a part of the communication unit 210 of FIG. 2, for performing beamforming.

Referring to FIG. 3A, the communication unit 210 includes an encoding and modulation unit 302, a digital beamforming unit 304, a plurality of transmission paths 306-1 to 306-N, and an analog beamforming unit 308.

The encoding and modulation unit 302 performs channel encoding. For channel encoding, at least one among a low density parity check (LDPC) code, a convolution code, and a polar code may be used. The encoding and modulation unit 302 also generates modulation symbols by performing constellation mapping.

The digital beamforming unit 304 performs beamforming on a digital signal (e.g., modulation symbols). To this end, the digital beamforming unit 304 multiplies modulation symbols by beamforming weights. Here, the beamforming weights are used to change a magnitude and phase of a signal, and may be referred to as "a precoding matrix", "a precoder", or the like. The digital beamforming unit 304 may output digital-beamformed modulation symbols to the plurality of transmission paths 306-1 to 306-N. According to a multiple-input multiple-output (MIMO) transmission technique, the modulation symbols may be multiplexed or the same modulation symbols may be provided to the plurality of transmission paths 306-1 to 306-N.

The plurality of transmission paths 306-1 to 306-N convert digital beamformed-signals into analog-signals. To this end, each of the plurality of transmission paths 306-1 to 306-N may include an inverse fast Fourier transform (IFFT) calculation unit, a cyclic prefix (CP) insertion unit, a DAC, and/or an up-conversion unit. The CP insertion unit is for an orthogonal frequency division multiplexing (OFDM) scheme, and may be excluded when another physical layer scheme (e.g., a filter bank multi-carrier (FBMC)) is applied. That is, the plurality of transmission paths 306-1 to 306-N provide independent signal processing processes to a plurality of streams generated via digital beamforming. However, depending on implementation, some elements of the plurality of transmission paths 306-1 to 306-N may be used in common or otherwise shared.

The analog beamforming unit 308 performs beamforming on an analog signal. To this end, the digital beamforming unit 304 multiplies analog signals by beamforming weights. The beamforming weights are used to change a magnitude and a phase of a signal. Specifically, according to a connection structure between the plurality of transmission paths 306-1 to 306-N and antennas, the analog beamforming unit 308 may be configured as shown in FIG. 3B or 3C.

Referring to FIG. 3B, signals input to the analog beamforming unit 308 are transmitted through the antennas via phase/magnitude conversion and amplification calculation. At this time, signals of respective paths are transmitted through different antenna sets, i.e., antenna arrays. Referring to processing of signals input through a first path, the signals are converted into signal sequences having different phases/magnitudes or the same phase/magnitude by phase/magnitude conversion units 312-1-1 to 312-1-M, amplified by the amplifiers 314-1-1 to 314-1-M, and then transmitted through the antennas.

Referring to FIG. 3C, signals input to the analog beamforming unit 308 are transmitted through the antennas via phase/magnitude conversion and amplification calculation. At this time, signals of respective paths are transmitted through the same antenna set, i.e., an antenna array. Referring to processing of signals input through the first path, the signals are converted into signal sequences having different phases/magnitudes or the same phase/magnitude by the phase/magnitude conversion units 312-1-1 to 312-1-M, and amplified by the amplifiers 314-1-1 to 314-1-M. For transmission through a single antenna array, the amplified signals are combined by combination units 316-1-1 to 316-1-M on the basis of antenna elements, and then transmitted through the antennas.

Values converted by the phase/magnitude conversion units 312-1-1 to 312-1-M illustrated in FIGS. 3B and 3C may include phase/magnitude values for adjusting the directivity of beams and phase/magnitude values for forming a plurality of beams (i.e., a multi-beam). The phase/magnitude values for forming a plurality of beams refer to phase/magnitude values for beamforming that provides spatially separated directions by generating a shaded area, in which a phase is offset, in the shape of formed beams. The number of the formed beams may be adjusted to control gains, for example, adjusted based on a channel, or may be adjusted to increase a gain improvement effect by a lens. According to an embodiment, in order to increase the gain improvement effect by the lens, the phase/magnitude values for forming a multi-beam may be used as reference phase/magnitude values of the phase/magnitude conversion units 312-1-1 to 312-1-M, in other words, default configuration values of the phase/magnitude conversion units 312-1-1 to 312-1-M.

FIG. 3B shows an example in which an independent antenna array specific to each transmission path (units 312-1-1 to 312-1-M and amplifiers 314-1-1 to 314-1-M; units 312-N-1 to 312-N-M and amplifiers 314-N-1 to 314-N-M) is used, and FIG. 3C shows an example in which transmission paths (units 312-1-1 to 312-1-M and amplifiers 314-1-1 to 314-1-M; units 312-N-1 to 312-N-M and amplifiers 314-N-1 to 314-N-M) share one antenna array. However, according to another embodiment, some transmission paths may use an independent array, and the remaining paths may share one antenna array. Further, according to another embodiment, a structure adaptively changeable depending on a situation may be used by applying a structure switchable between transmission paths and antenna arrays.

According to the configuration of the beamforming device (e.g., the terminal 120) described by referring to FIGS. 2, 3A and 3C, the beamforming device may improve a gain of a signal emitted from an antenna array or a gain of a signal received in the antenna array. Similarly, a base station (e.g., the base station 110-1 or the base station 110-2) may also have at least one lens. Further, according to embodiments, the base station may include a lens having a structure to be described hereinafter. Therefore, embodiments related to the lens will be described with reference to a terminal for convenience of explanation. However, embodiments to be described hereinafter may be applied to any device that performs beamforming as well as a base station.

A gain of a signal may be improved by using a lens (e.g., the lens 230). The lens may increase a gain of an antenna by changing, to in-phase, a phase profile of an electromagnetic (EM) wave in a space. The principle of increase of a signal gain by a lens will be described with reference to FIGS. 4A, 4B and 4C.

Figure 4A:
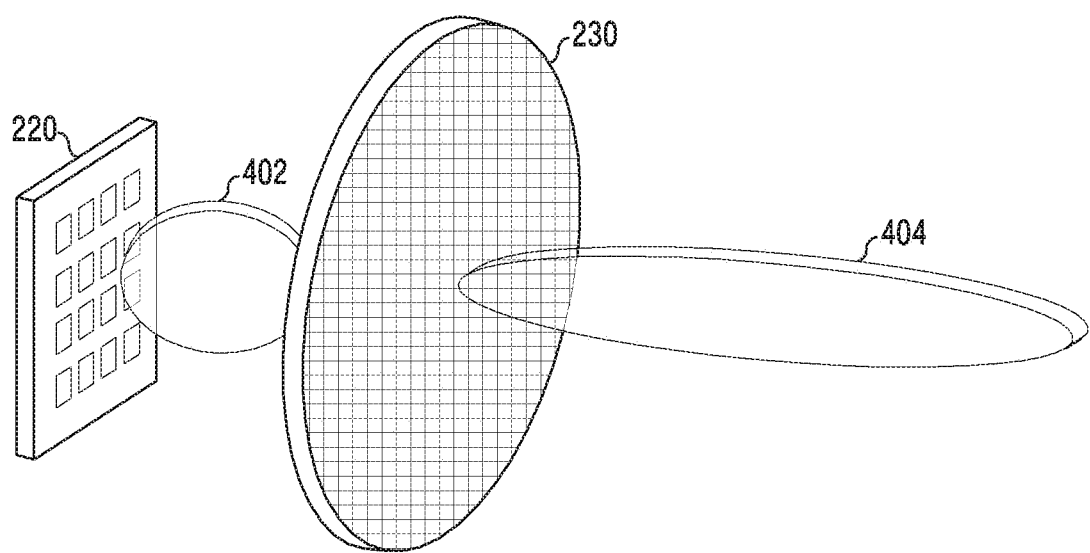
FIGS. 4A, 4B and 4C illustrate improvements of a signal gain through a lens in a wireless communication system according to embodiments of the disclosure.
Figure 4B:
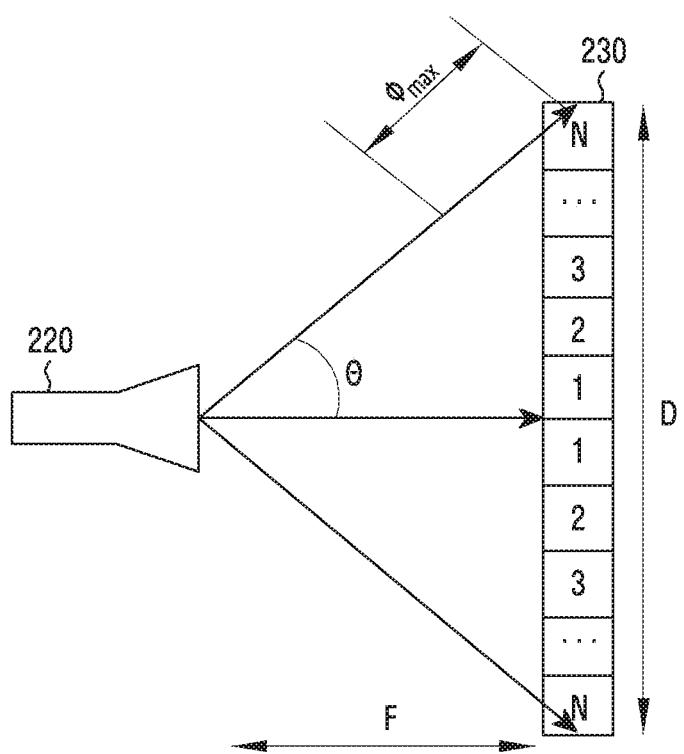
Figure 4C:
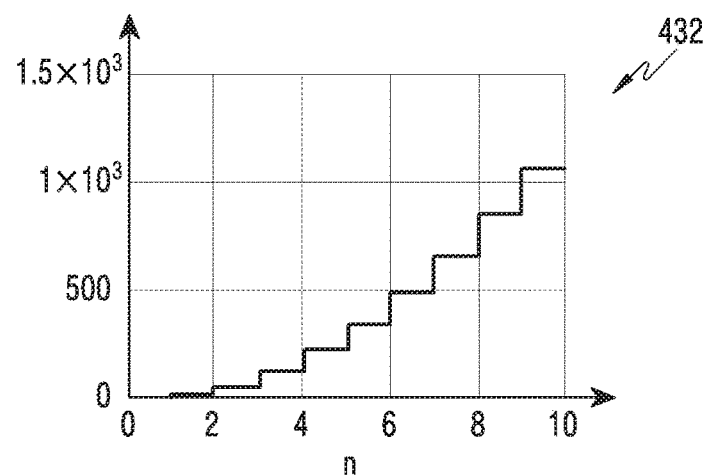
Figure 4C:
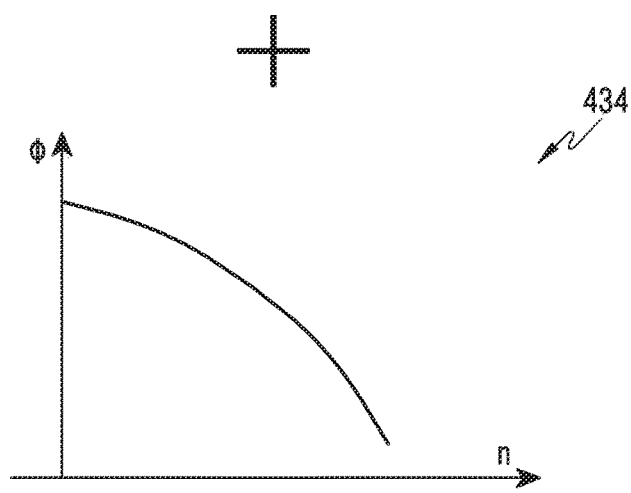
Figure 4C:
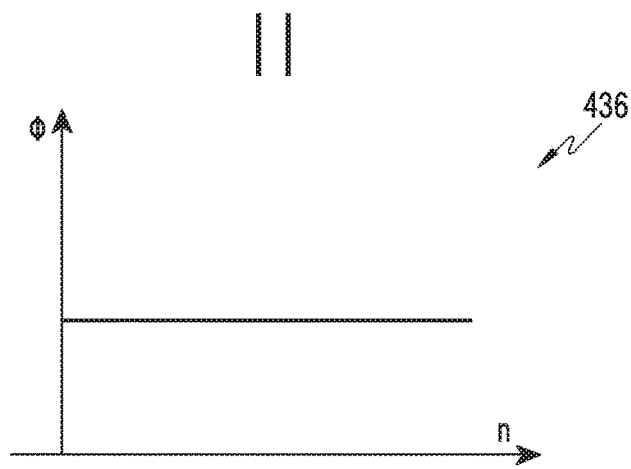

FIGS. 4A to 4C illustrate improvements of signal gain through a lens in wireless communication systems according to embodiments of the disclosure.

Referring to FIG. 4A, a signal emitted from the antenna array 220 passes through the lens 230. A beam 404 having passed through the lens 230 may have a narrower beam width than a beam 402 emitted from the antenna array 220. Beam components for forming the beam 404 are superimposed more in a specific space, and therefore a phase increases. Improvement of a signal gain by the lens 230 is achieved by converting the in-phase from the surface of a sphere to the plane. That is, a phase of each component of the emitted signal may be converted to in-phase in the plane of the lens 230. Specifically, because the beam generated in the antenna array 220 is emitted from the center of the antenna, that is, from the focus of the beam, an in-phase surface is formed on the surface of a sphere centered at the focus. The lens 230 converts the in-phase surface to the plane by using unit cells.

Referring to FIG. 4B, when a radius of the lens 230 and a distance between the lens 230 and the antenna array 220 are given, a maximum phase difference of the signal widened by angle θ and observed on the surface of the lens 230 is expressed by Equation 1 below.

$$\phi_{max} = \frac{2\pi}{\lambda}\left[\sqrt{1+\left(\frac{D}{2F}\right)^2}-1\right]$$ Equation 1

In Equation 1, $\Phi_{max}$ represents a maximum phase difference, λ represents a wavelength, D represents a radius of the lens, and F represents a distance between the lens and the antenna array.

A phase profile change of the beam emitted from the antenna array 220 and widened by angle θ is shown in FIG. 4C.

Referring to FIG. 4C, graph 432 shows a phase profile on the plane (e.g., the surface of the lens 230 or a plane parallel to the surface of the lens 230) of the beam emitted from the antenna array 220, graph 434 shows a phase profile of the lens 230, and graph 436 shows an in-phase profile of the beam passed through the lens 230. As shown in graph 432, as distance "n" from the center of the plane increases, a phase difference with the center increases. Therefore, as shown in graph 434, to compensate for the phase profile as in graph 432, the lens 230 is designed such that a phase difference from the center decreases as a distance from the center increases. Accordingly, the phase profile of the beam passed through the lens 230 is in phase or substantially in phase with respect to the plane, as shown in graph 436.

As described above, the beam emitted from the antenna array 220 passes through the lens 230. Here, an area including unit cells contacting the formed beam (or beams) from among the unit cells included in the lens 230 may be referred to as "a projection area (illuminated field)" of the lens 230. An area of the illuminated field may influence a signal gain improvement effect by the lens 230. A relationship between the area of the illuminated field and the improvement effect of a beamforming gain will be described below with reference to FIGS. 5A to 5C and FIGS. 6A to 6C.

Figure 5A:
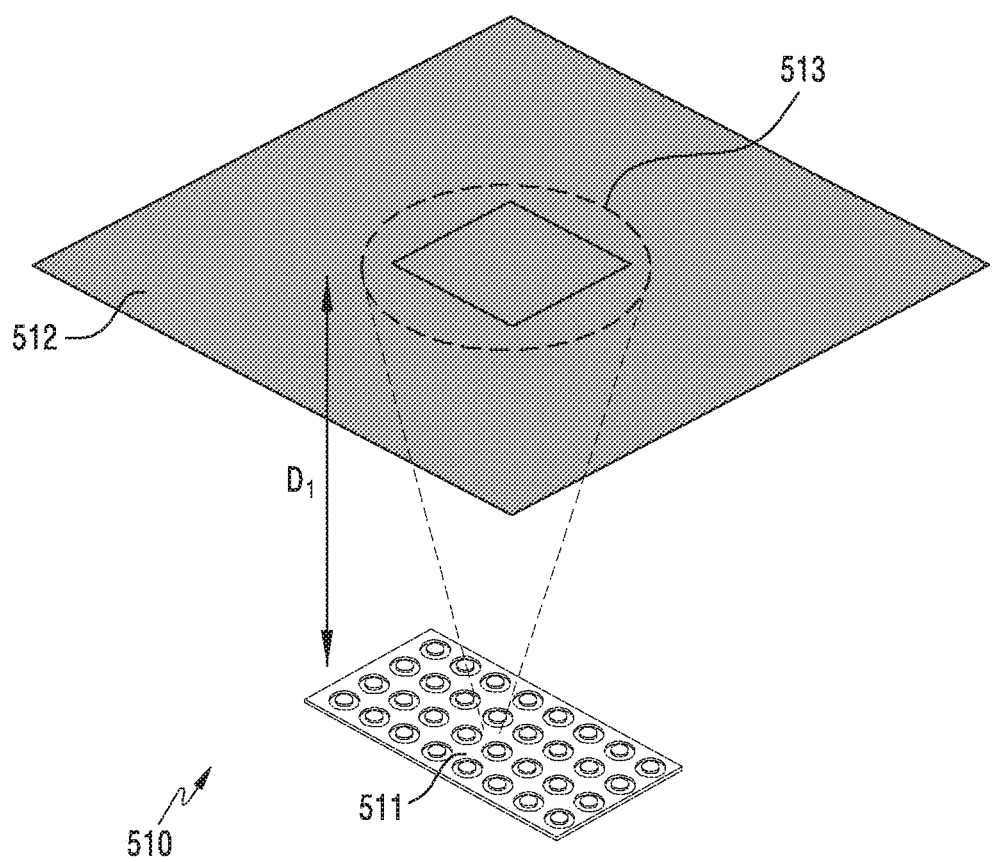
FIGS. 5A, 5B and 5C illustrate principles of improvement of a signal gain according to a distance between an antenna and a lens in a wireless communication system according to embodiments of the disclosure.
Figure 5B:
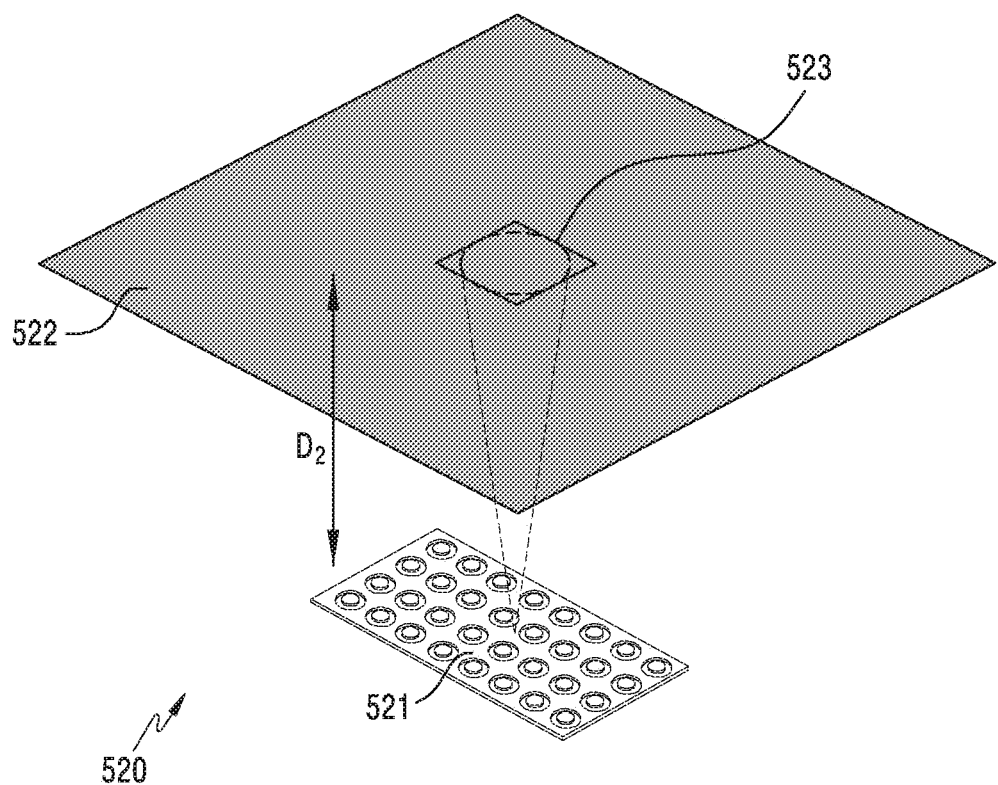
Figure 5C:
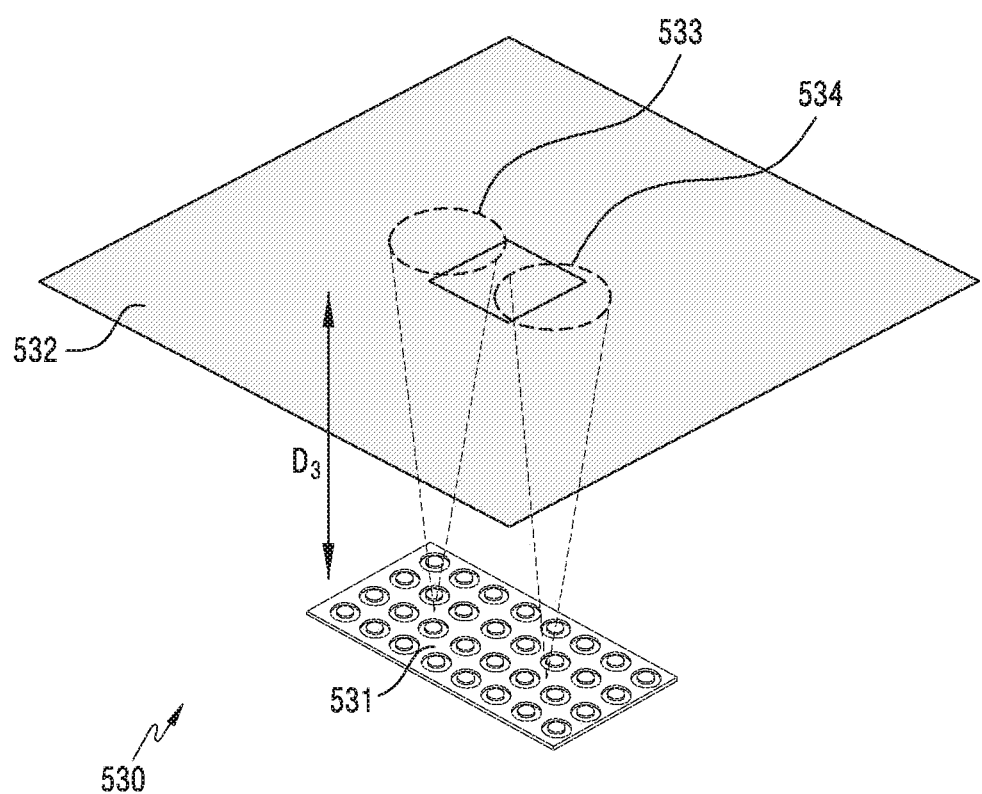

FIGS. 5A to 5C illustrate a principle of improvement of a signal gain according to a distance between an antenna and a lens in a wireless communication system according to embodiments of the disclosure. In FIGS. 5A to 5C, on the basis of three examples of a beamforming device, a method of improving a signal gain considering a distance between an antenna array and a lens is described.

Referring to FIG. 5A, in a first example 510 the beamforming device may include a first antenna array 511 and a first lens 512. The beamforming device emits a signal through the first antenna array 511. The signal is emitted while being directed within a particular angle range. A first illuminated field 513 is formed as a physical area that contacts the first lens 512 by an emitted signal. The distance between the first antenna array 511 and the first lens 512 may be $D_1$.

Referring to FIG. 5B, in a second example 520 the beamforming device may include a second antenna array 521 and a second lens 522. The beamforming device emits a signal through the second antenna array 521. The signal is emitted while being directed within a particular angle range. A second illuminated field 523 is formed as a physical area that contacts the second lens 522 by an emitted signal. The distance between the second antenna array 521 and the second lens 522 may be $D_2$. Hereinafter, a situation in which $D_2$ is smaller than $D_1$ is described as an example.

An area projected onto the lens of the beamforming device, that is, a width of the illuminated field, is determined by the distance between the antenna array and the lens. That is, the width of the illuminated field is dependent on the distance between the antenna array and the lens. For example, because $D_1$ is greater than $D_2$, the first illuminated field 513 on the first lens 512 is larger than the second illuminated field 523 on the second lens 522. This is because, in consideration of the distance between the lens and the antenna array mounted on the beamforming device, a width of a beam formed by a signal starting to be emitted becomes wider as the beam progresses.

The distance between the antenna array and the lens is related to improvement of a signal gain. This is because lens performance is determined based on an area (the illuminated field) in which a beamformed signal is projected onto the lens, that is, a distribution area of an electromagnetic (EM) or electric (E)-field. As the illuminated field on the lens increases, there are many signal components for controlling a gain in the lens, that is, the number of in-lens phase-shiftable unit cells increases, so that the beamforming gain may be improved. However, due to constraints on a physical size of the beamforming device, it may be difficult to ensure a required distance between the antenna array and the lens. Increasing the distance between the antenna array and the lens causes an increase in a size of the device, i.e., a set volume. That is, increasing the distance between the antenna array and the lens may hinder the mountability/mass productivity of the lens. Therefore, in order to miniaturize the beamforming device, a method for reducing the distance between the antenna array and the lens while increasing a projection area on the lens is required.

Referring to FIG. 5C, in a third example 530 the beamforming device may include a third antenna array 531 and a third lens 532. The beamforming device emits a signal through the third antenna array 531. Each signal is emitted while being directed within a particular angle range. For example, a situation in which signals having two independent directions are emitted in the third antenna array 531 will be described. Here, the independence between directions may mean that an angle between a direction of a beam formed by a signal and a direction of the other beam formed by the signal is equal to or greater than a particular angle. That is, each of beams formed by the signal has directivity that is mutually and spatially distinguished. A third illuminated field 533 and a fourth illuminated field 534 are formed as physical areas that contact the third lens 532 by the signals. The distance between the third antenna array 531 and the third lens 532 may be $D_3$. Hereinafter, a situation in which $D_3$ and $D_2$ are equal is described as an example. Because $D_3$ and $D_2$ have the same value, a mounting area of the third antenna array 531 and the third lens 532 in the beamforming device may correspond to a mounting area of the second antenna array 521 and the second lens 522.

Even if the beamforming device in the third example 530 is designed to have the same size as that of the beamforming device in the second example 520, a total area of the illuminated field on the third lens 532 may be larger than an area of the illuminated field on the second lens 522. On the third lens 532, signals emitted in independent directions (or paths) are respectively projected to form independent projection areas. The third beamforming device forms a third projection area 533 and a fourth projection area 534 on the third lens 532.

According to embodiments, the beamforming device may form a plurality of projection areas on the lens via a plurality of beams. As the plurality of projection areas are formed on the lens, a beamforming gain of the beamforming device through the lens may be increased without changing a physical design (e.g., increasing a size of the beamforming device according to the distance between the antenna array and the lens). A beam control technique according to embodiments may increase an area of a projection area on a lens by increasing the number of beams formed by signals emitted from an antenna array, and improvement of a beamforming gain through the lens may be enhanced by arrangement of unit cells in the lens according to a phase mask corresponding to the beams.

Before describing a beamforming and lens design scheme of the disclosure, terms necessary for explanation are defined. A multi-beam is a beam (or beams) including two or more components having independent directivity by beamforming Specifically, a shaded area, in which a phase is offset (i.e., negate phases, cancel out phase), may be generated in a shape of a beam(s) formed through beamforming. As the shaded area is generated, spatially distinguished signal components may be formed. Here, spatially distinguishing the signal components means that an area, in which a magnitude of an emitted signal is equal to or greater than a particular magnitude, is provided in a spatially divided form. Each of the signal components in the divided form may be referred to as a beam. That is, a multi-beam may include a plurality of beams. A signal is emitted using a multi-beam, through a multi-beam, or by application of a phase pattern for forming a multi-beam.

Multi-beamforming refers to a beamforming operation of forming a multi-beam. A beamforming device may perform multi-beamforming to form a beam in a form including two or more components having independent directivity.

A single beam is a concept opposite to a multi-beam and means a beam in a form providing a single direction at beamforming, instead of providing a plurality of directions.

A phase pattern may be a set of phase values with respect to antenna elements for forming a beam in an antenna array. As a phase pattern is changed, a direction of a beam formed in an antenna array and a shape of the beam may be changed.

A unit cell is a unit constituting a lens, and may include at least one dielectric and at least one metal. The dielectric may include, for example, at least one of a semiconductor device, a liquid crystal material, and a photoelectric material. The dielectric may have a variable dielectric constant or a fixed dielectric constant. A unit cell provides a dielectric constant through a dielectric or metal, and may delay a phase of an incident signal component according to the dielectric constant. A unit cell may have a phase shift value according to a phase delay. That is, a unit cell may be an element for controlling a gain of a beam incident on a lens. A unit cell may also have a capacitance (or a refractive index). In some embodiments, unit cell comprises at least one dielectric and at least one metal. In some embodiments, dielectric comprises at least one of a semiconductor device, a liquid crystal material, or a photoelectric material, and the dielectric is configured to provide a variable dielectric constant or a fixed dielectric constant.

Figure 6A:
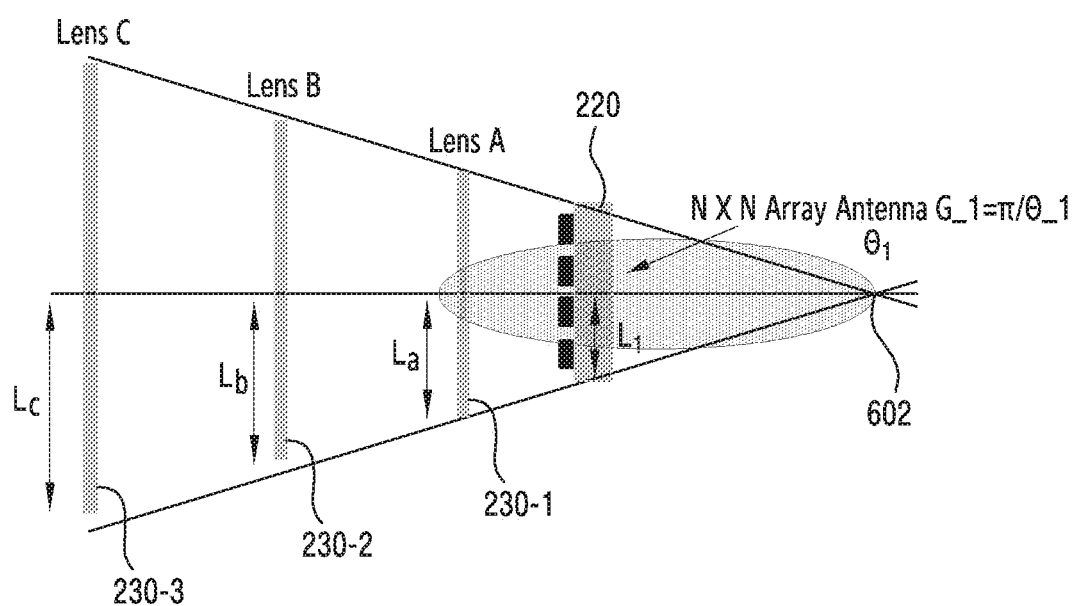
FIGS. 6A and 6B illustrate areas of an illuminated field on a lens according to beamforming in a wireless communication system according to embodiments of the disclosure.
Figure 6B:
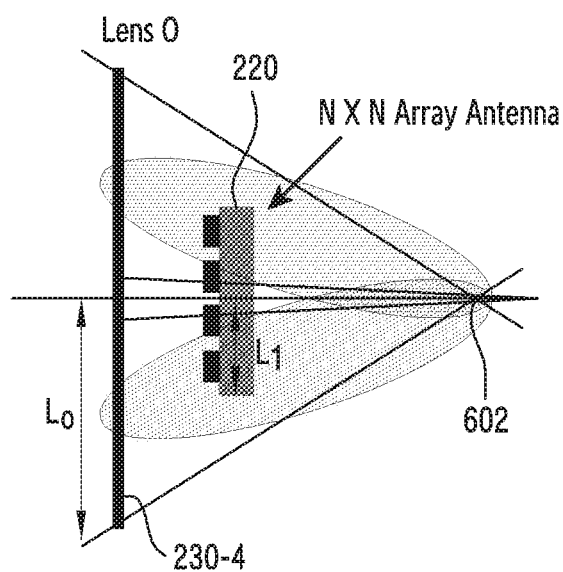

FIGS. 6A and 6B illustrate an area of an illuminated field on a lens according to beamforming in a wireless communication system according to an embodiment of the disclosure. FIG. 6A illustrates a single beam, and FIG. 6B illustrates a multi-beam. The configuration illustrated in FIGS. 6A and 6B may be understood as an example of the antenna array 220 and the lens 230 in FIG. 2.

Referring to FIG. 6A, a beam generated at the antenna array 220 is emitted from a virtual focus 602, while being widened at angle $\theta_1$. When three lenses, lens A 230-1, lens B 230-2, and lens C 230-3 are arranged as shown in FIG. 6A, because the three lenses are spaced away from the antenna array 220 in the order of lens A 230-1, lens B 230-2, and lens C 230-3, gains thereof may increase in the order of lens A 230-1, lens B 230-2, and lens C 230-3. For example, the gains of the lenses are shown in Table 1 below.

TABLE 1

| | L (an effective distance of a lens) | Gain |
| --- | --- | --- |
| Lens A | $L_a = L1$ | $G_1$ (= $\pi/\theta_1$) |
| Lens B | $L_b = 2 \times L1$ | $G_1 + 3$ dB |
| Lens C | $L_c = 4 \times L1$ | $G_1 + 6$ dB |

Referring to FIG. 6B, the beamforming device may form a plurality of beams, a multi-beam, through the antenna array 220. Each beam of a signal forming a multi-beam may be emitted from a virtual focus while being widened. The multi-beam has a larger number of beams than the single beam in FIG. 6A. That is, the multi-beam has more independent paths than the single beam. Even if lens O 230-4 is disposed, as shown in FIG. 6B, at a somewhat shorter distance compared to FIG. 6A, a higher gain may be obtained due to a projection area that is increased by the plurality of beams (or signal components). For example, in lens O 230-4, the gain for each beam may be expressed as shown in Table 2 below.

TABLE 2

| | L (an effective distance of a lens) | Gain |
| --- | --- | --- |
| Lens O | $L_O = k \times L_1$ | $G_1 + 10\log(k)$ |

As a total projected area on lens O 230-4 increases, a signal gain may increase in proportion to the number of beams. For example, the gain via the multi-beam may be within ($G_1$+10 log (k)) N, where "N" represents the number of the plurality of beams included in the multi-beam.

Spatially separated beams, as shown in FIG. 6B, i.e., a multi-beam, are difficult to form by a device using a single antenna. In order to form a plurality of beams, it is required to have an antenna array (e.g., the antenna array 220) or a higher order resonant antenna. At this time, it is preferable to use an antenna array in consideration of beam directivity assignment, i.e., a steering function of the beams. That is, when an array antenna is used, not only beam shapes for forming the plurality of beams, but also the directivity of the beams may be controlled.

Hereinafter, on the basis of FIGS. 7 to 12C, methods for improving a beamforming gain by using a lens through multi-beam forming will be described. According to embodiments, operations of a beam-forming device, which are required to form a multi-beam, controlling of setting values required for an antenna array or a lens, or a lens design scheme will be described.

Figure 7:
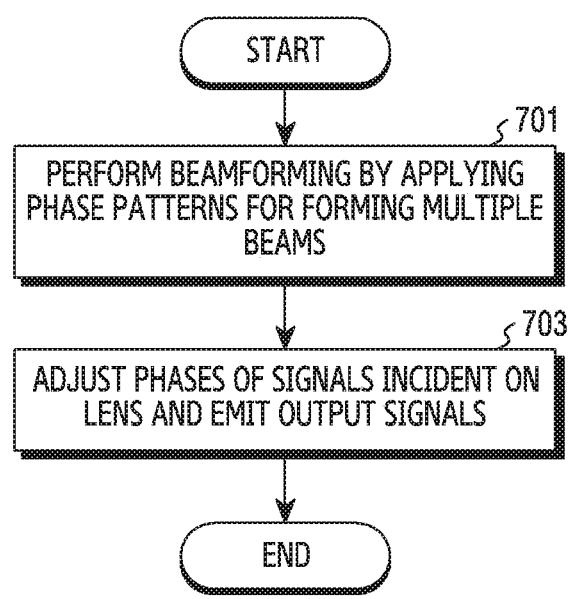
FIG. 7 is a flow diagram of beamforming device operations for emitting a signal by using a lens in a wireless communication system according to an embodiment of the disclosure.

FIG. 7 is a flow diagram of beamforming device operations for emitting a signal by using a lens in a wireless communication system according to an embodiment of the disclosure. According to embodiments, a beamforming device illustrates an operation method of the terminal 120.

Referring to FIG. 7, in operation 701 the beamforming device may perform beamforming by applying, to signals, a phase pattern for forming a plurality of beams. The beamforming device may perform multi-beamforming.

The beamforming device may identify the phase pattern for forming a multi-beam. The phase pattern may be a value defined for forming the multi-beam. The phase pattern of the disclosure is a separate control factor in consideration of a channel, for example, phase values (e.g., phase values of analog beamforming) for beamforming for applying directivity, and means a combination of phase values defined in relation to a lens.

The phase pattern may be defined according to a type of the multi-beam. For example, the phase pattern may be defined specific to the number of beams included in the multi-beam. As another example, the phase pattern may be defined according to a form of the multi-beam. This is because the multi-beam may be formed in another form even if the multi-beam includes the same number of beams. According to embodiments, the beamforming device may identify a specific phase pattern from a plurality of phase patterns. In some embodiments, the specific phase pattern includes phase values for forming the multi-beam (i.e., the plurality of beams). However, as another embodiment, the beamforming device may identify only one fixed phase pattern.

The beamforming device may control an antenna array so that phase values included in the identified phase pattern are applied. The beamforming device emits a signal through the antenna array. The signal emitted from the antenna array is incident on the lens.

In operation 703, the beamforming device may emit output signals by adjusting phases of respective signals incident on the lens, by using the plurality of beams. According to embodiments, the lens may be a lens based on the phase pattern for forming the multi-beam.

The lens may be configured to convert a phase of the incident signal. In some embodiments, the method further comprises controlling an active element of the lens to adaptively adjust the phases of respective incident signals. The lens may include unit cells, and the unit cells may have corresponding phase shift values on the basis of the phase pattern for forming the multi-beam. A pattern of the phase shift values of the unit cells may be referred to as a phase mask. The lens may convert the phase of the incident signal on the basis of the phase shift values according to the phase mask. The phase of each incident signal is adjusted based on the phase shift values and phase profiles for the signals incident on the lens. According to embodiments, unit cells arranged at corresponding positions on a symmetry surface of the lens may have a phase difference within a particular range (about 180 degrees). In some embodiments, the phase difference corresponds to substantially 180-degree. The unit cells arranged at corresponding positions on the symmetry surface of the lens may have the phase difference of about 180 degrees. For example, the particular range may be greater than 175 degrees and smaller than 185 degrees. In some embodiments, the method further comprises controlling a variable dielectric constant of the unit cells to adaptively adjust the phases of respective incident signals.

The lens is disposed at a particular distance in a signal emission direction of the antenna array, and a signal of a wide beam, to which the phase pattern value has been applied, is thus emitted to a wireless channel (i.e., air) through the lens. As the signal passes through the lens, an isotropic surface of the signal becomes identical or substantially similar to a lens plane, and consequently a signal gain maybe improved.

As described above, the beamforming device (e.g., a terminal and a base station) according to embodiments may increase the number of beams of a signal emitted from the antenna array, thereby increasing utilization of the lens. Moreover, by way of forming a multi-beam, a distance between the antenna array and the lens may be very short, which causes reduction in a set volume. Hereinafter, FIGS. 8A, 8B, 8C and 8D illustrate effects of gain control improvements of the lens due to the multi-beam, and FIGS. 9A and 9B illustrate effects of gain control improvements of the lens due to the multi-beam.

FIGS. 8A, 8B, 8C and 8D illustrate examples of gain and projection area on a lens through a dual-beam in a wireless communication system according to an embodiment of the disclosure.

Figure 8A:
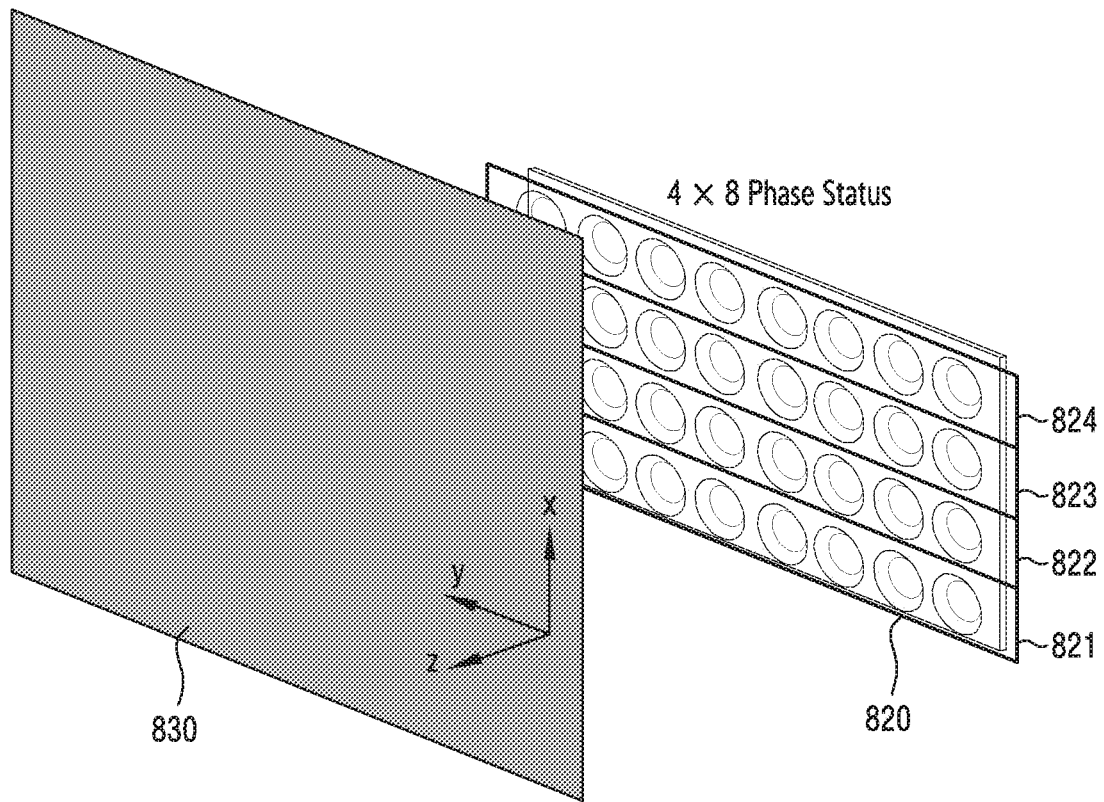
FIGS. 8A, 8B, 8C and 8D illustrate examples of gain and projection area on a lens through a dual-beam in a wireless communication system according to embodiments of the disclosure.
Figure 9A:
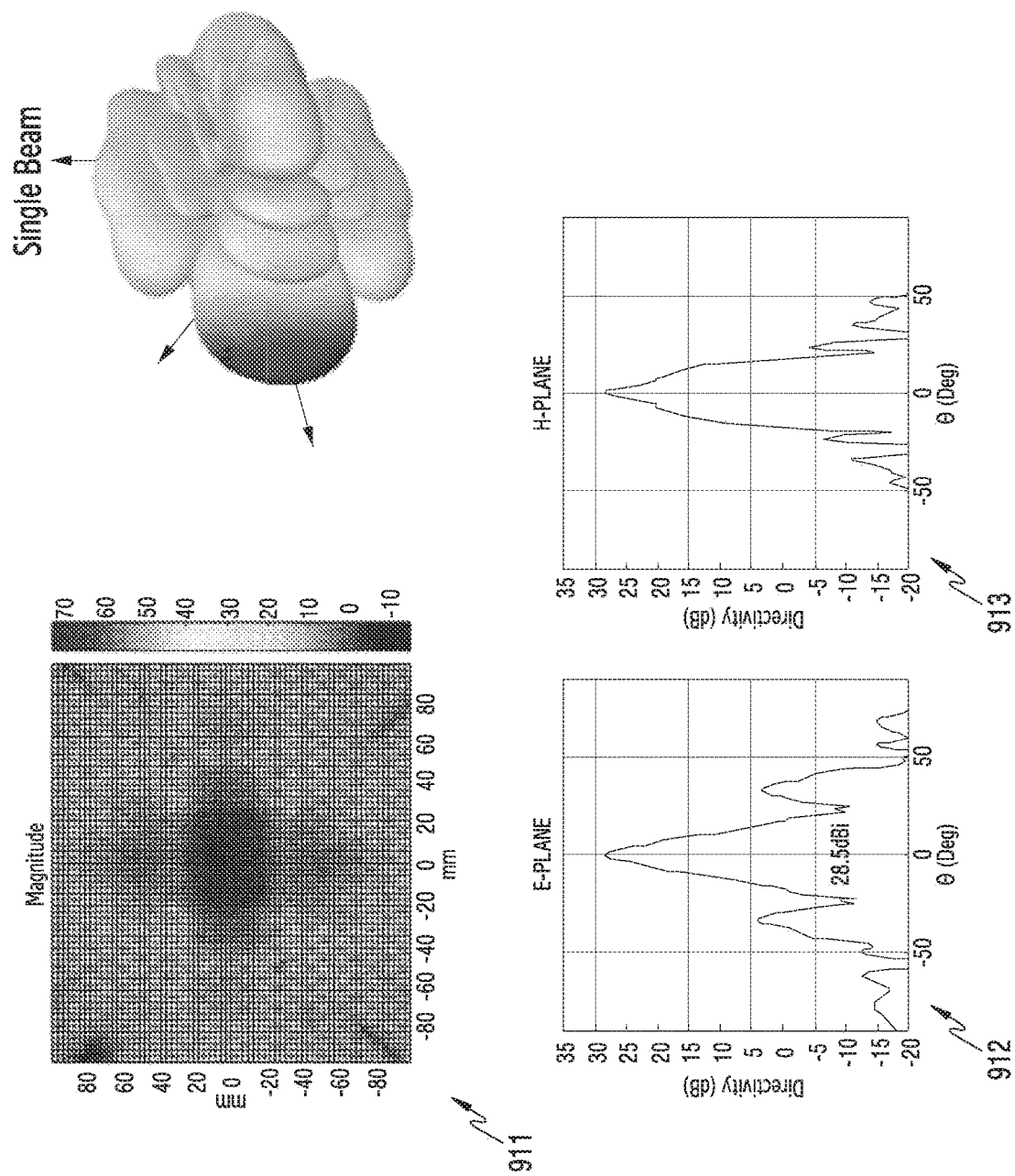
FIGS. 9A and 9B illustrate examples of gain and projection area on a lens through a quad-beam in a wireless communication system according to embodiments of the disclosure.
Figure 9B:
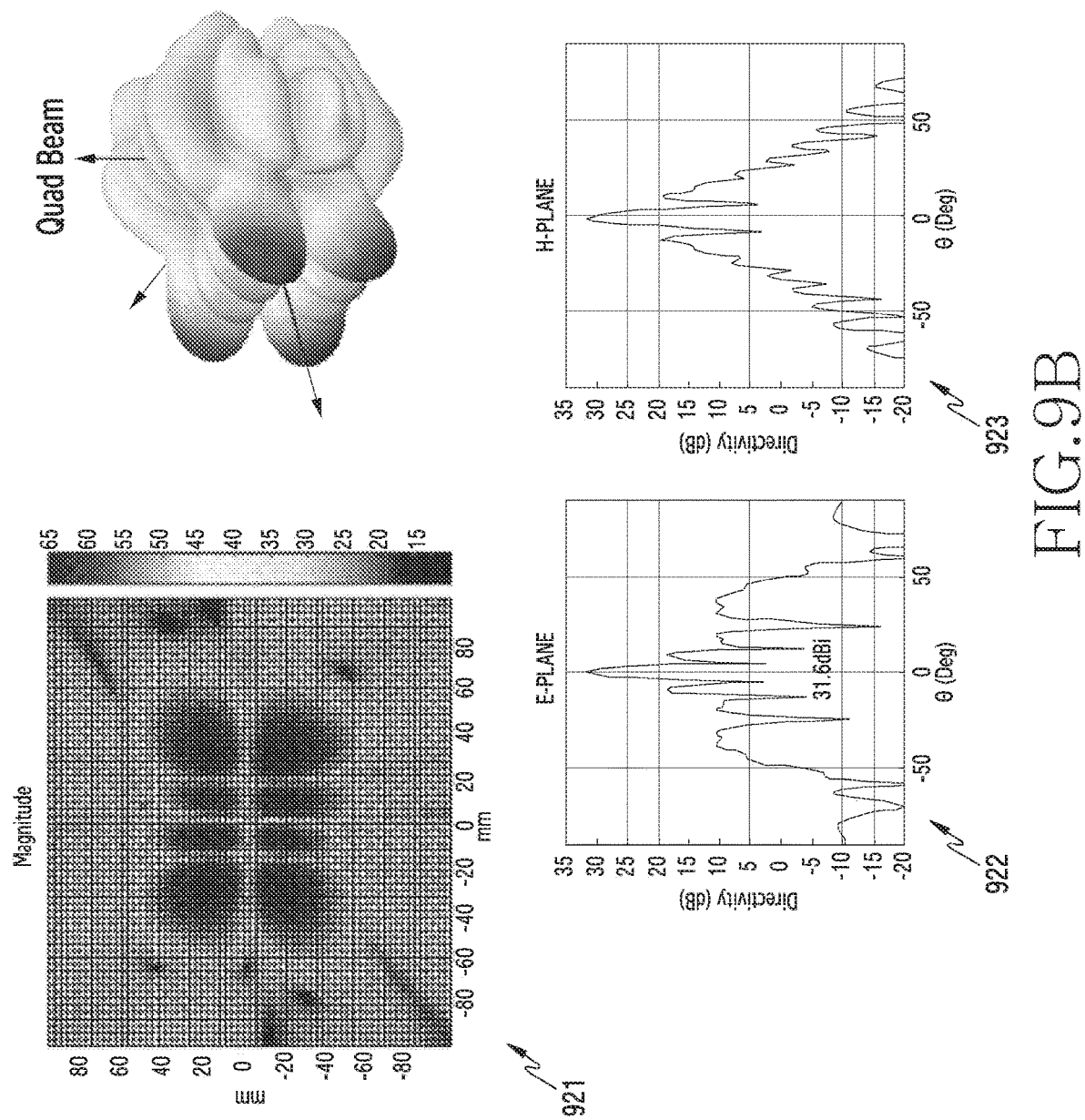

Referring to FIG. 8A, a beamforming device may include an antenna array 820 and a lens 830. The beamforming device may perform beamforming so that at least one beam is formed at the antenna array 820. The lens 830 controls a gain of a signal emitted to another device by converting phase values for signals beamformed at the antenna array 820.

The antenna array 820 may include antenna elements capable of adjusting a phase value. Each of the antenna elements may provide a phase status by applying independent phase value. According to embodiments, the antenna array 820 is a 2D antenna array, and may provide 3D beamforming (or elevation beamforming) that performs beamforming with different elevations.

In the following description, the antenna array 820 is illustrated as a two-dimensional (2-dimensional, 2D) antenna array. In a 2D antenna array, a beam shape according to an elevation may be adjusted by a phase difference between rows, and a beam shape according to an azimuth may be adjusted by a phase difference between columns. According to an embodiment, the antenna array 820 may provide 32 phase statuses through eight antenna elements in the horizontal axis (or azimuth) and four antenna elements in the vertical axis (or elevation). The beamforming device may adjust a phase pattern by controlling phase statuses of the respective antenna elements in the unit of horizontal axis or the unit of vertical axis. As an example, the beamforming device may adjust the phase pattern in unit of vertical axis. The vertical axis may include a first position 821, a second position 822, a third position 823, and a fourth position 824. However, the embodiments are not limited to 4×8 sized 2D antenna arrays.

The beamforming device may form a single beam at the antenna array 820 or may form a dual-beam as an example of a multi-beam. Here, the dual-beam refers to a beam configured by two beams having independent directivity by formation of a shaded area due to a phase difference between signal components emitted at beamforming A single beam is a beam in which no shaded area is formed and two or more beams having independent directivity are not generated. Hereinafter, gain improvement via a single beam is illustrated in FIG. 8B, and gain improvement via a dual-beam is illustrated in FIGS. 8C and 8D.

Figure 8B:
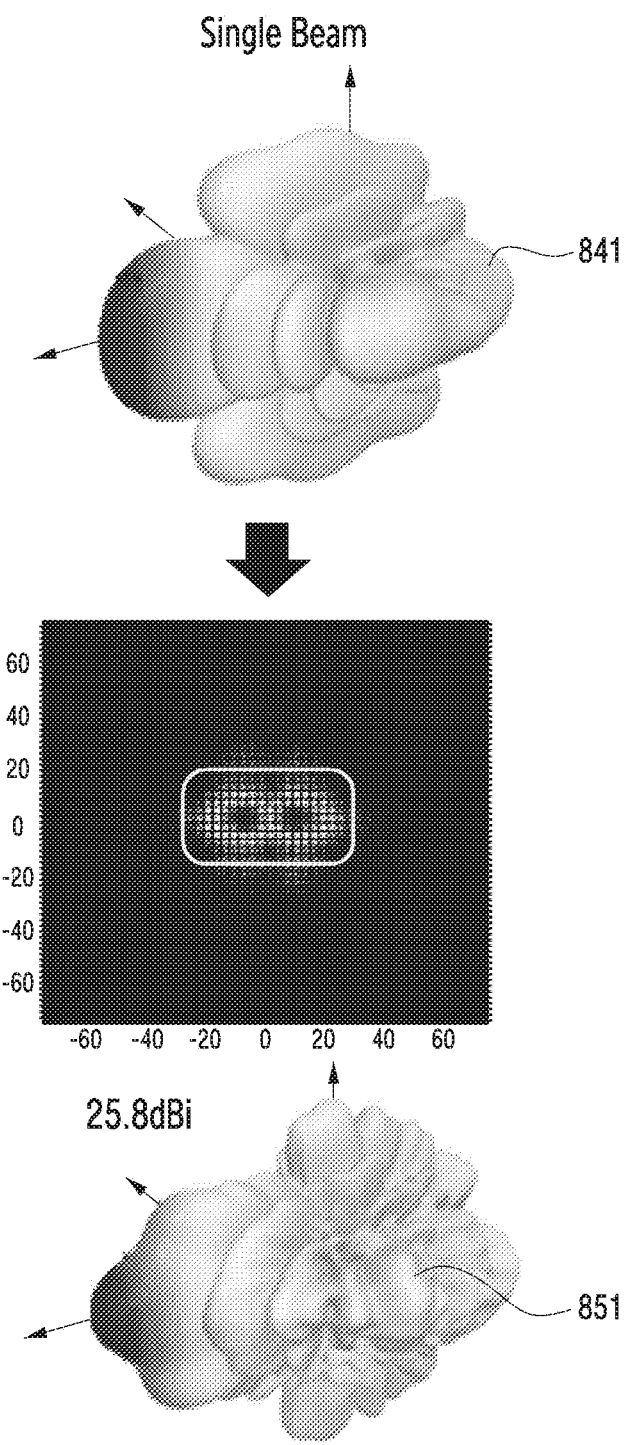
Figure 8C:
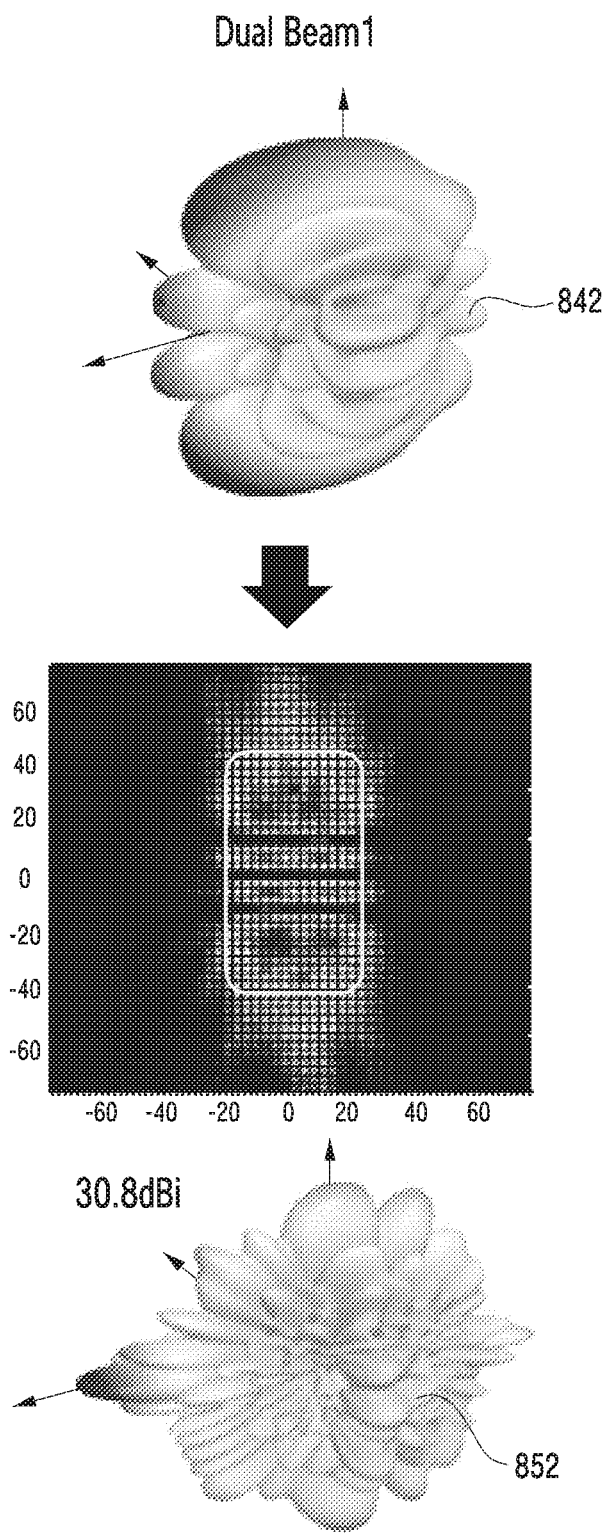
Figure 8D:
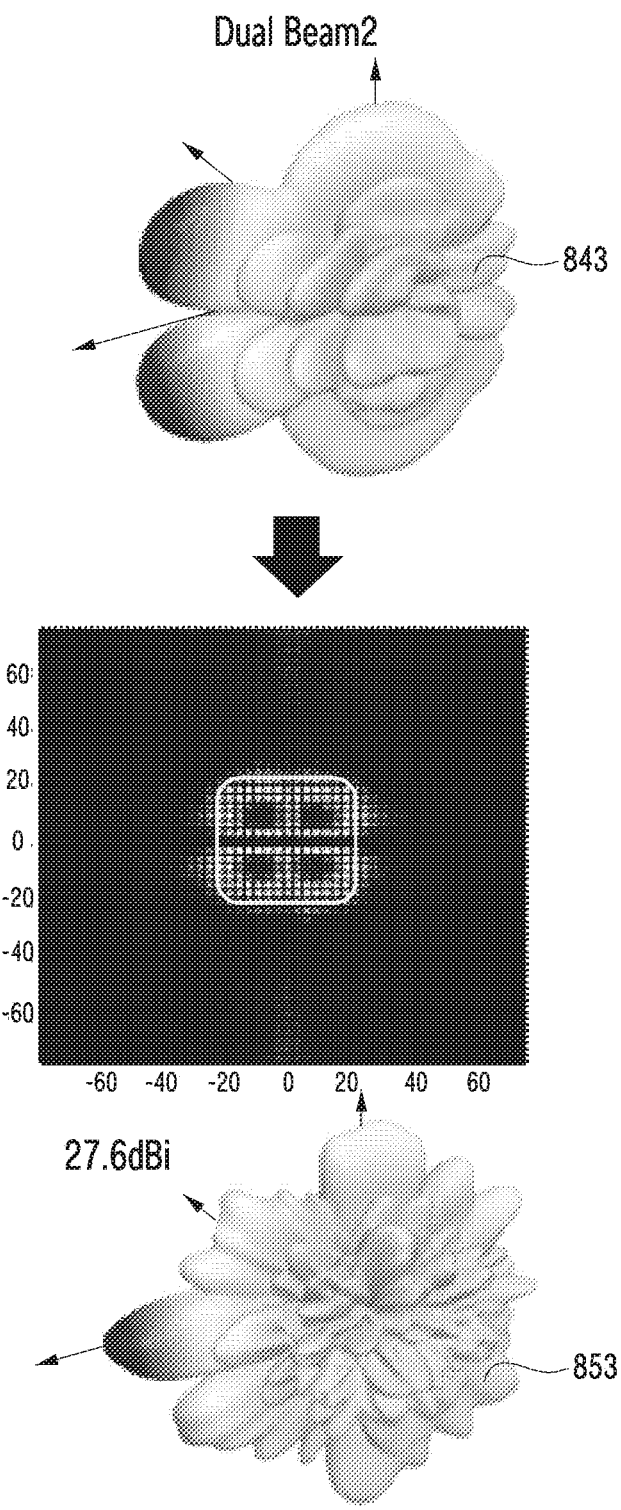

Referring to FIG. 8B, the beamforming device may perform beamforming so that a single beam 841 is formed at the antenna array 820. A gain of the single beam 841 is 20.0 dBi (decibel with respect to isotropic). As the single beam 841 passes through the lens, the beam 851 is emitted. Referring to FIG. 8C, the beamforming device may perform beamforming so that a first dual-beam 842 is formed at the antenna array 820. A gain of the first dual-beam 842 is 20.0 dBi. As the first dual-beam 842 passes through the lens, a beam 852 is emitted. Referring to FIG. 8D, the beamforming device may perform beamforming so that a second dual-beam 843 is formed at the antenna array 820. A gain of the second dual-beam 843 is 20.0 dBi. As the second dual-beam 843 passes through the lens, a beam 853 is emitted. The unit cells of the lens, which are used in FIGS. 8B to 8D are configured as shown in Table 3 below.

TABLE 3

| ID | Single beam | First dual-beam | Second dual-beam |
|---|---|---|---|
| #1 | 0° | 0° | 0° |
| #2 | 0° | 180° | 0° |
| #3 | 0° | 0° | 180° |
| #4 | 0° | 180° | 180° |

Here, ID #1 represents phase statuses for the first position 821 of FIG. 8A, ID #2 represents phase statuses for the second position 822 of FIG. 8A, ID #3 represents phase statuses for the third position 823 of FIG. 8A, and ID #4 represents phase statuses for the fourth position 824 of FIG. 8A.

Based on FIGS. 8B to 8D, an increase in a beamforming gain due to the lens is identified. In FIG. 8B, a gain of the beam 851 is 25.8 dBi, which has been increased by 5.8 dB compared to the single beam 841. In FIG. 8C, a gain of the beam 852 is 30.8 dBi, which has been increased by 10.8 dBi compared to the first dual-beam 842. In FIG. 8D, a gain of the beam 853 is 27.6 dBi, which has been increased by 7.6 dBi compared to the second dual-beam 843.

Based on FIGS. 8B to 8D, it is identified that a projection area, in which the single beam 841, the first dual-beam 842, and the second dual-beam 843 are in contact with the lens surface, changes. Further, as the projection area on the lens changes, the beamforming gain of the signal emitted from the lens also changes. As the contact area increases, it is identified that beamforming gains are increased to 25.8 dBi, 27.6 dBi, and 30.8 dBi in the order of the single beam 841, the second dual beam 843, and the first dual beam 842.

FIGS. 9A and 9B illustrate examples of gain and projection area on a lens through a quad-beam in a wireless communication system according to an embodiment of the disclosure. Here, the quad-beam refers to a beam configured by four beams having independent directivity by formation of a plurality of shaded areas due to a phase difference between signal components emitted at beamforming.

Referring to FIG. 9A, a beamforming device performs beamforming to form a single beam, wherein the single beam passes through a lens and a gain is controlled. FIG. 9A illustrates an experiment result obtained by measurement in a situation where a distance between an antenna array and a lens is about 5 cm. Graph 911 shows a gain of a single beam on a lens surface. Graph 912 and graph 913 show the directivity in the E-plane and H-plane of a beam, respectively, which are formed from the single beam passing through the lens. Here, the directivity indicates a size in each field (e.g., E-field and H-field), and the unit of the directivity is dBi. The vertical axes of graph 912 and graph 913 indicate directivity and the horizontal axes of graph 912 and graph 913 indicate a physical position of the beam. Graph 912 shows that the gain of the single beam is 28.5 dBi. Although not illustrated in FIG. 9A, in a situation where a distance between the antenna array and the lens is about 10 cm, the gain of a beam formed from the single beam passing through the lens is identified to be 30.5 dBi. An improved gain is provided as the distance between the antenna array and the lens increases.

Referring to FIG. 9B, a beamforming device performs beamforming to form a quad-beam, wherein the quad-beam passes through a lens and a gain is controlled. FIG. 9B illustrates an experiment result obtained by measurement in a situation where a distance between an antenna array and a lens is about 5 cm. Graph 921 shows a gain of a quad-beam on a lens surface. Graph 922 and graph 923 show the directivity in the E-plane and H-plane of a beam, respectively, which are formed from the quad-beam passing through the lens. Here, the directivity indicates a size in each field (e.g., E-field and H-field), and the unit of the directivity is dBi. The vertical axes of graph 922 and graph 923 indicate directivity and the horizontal axes of graph 922 and graph 923 indicate a physical position of the beam. Graph 922 shows that the gain of the quad-beam is 31.6 dBi gain.

It may be identified that a signal gain is increased when the quad-beam passes through the lens rather than when the single beam passes through the lens. It is also identified that formation of beams having independent directionality is more effective in improving a signal gain, compared to a case of increasing the distance of about 5 cm (e.g., about 5 cm to 10 cm). As described above, this is because an area, in which a signal having a particular intensity or greater is contacted with the lens, is increased by formation of a plurality of beams.

With reference to FIGS. 8A to 9B, it has been described that a gain control effect of a signal passing through a lens is improved by performing beamforming to form a multi-beam. As the multi-beam is formed in an antenna array, a projected area on the lens increases. As the projection area is increased, the signal gain control effect in the lens is improved. However, in order to control the gain by converting components of beams incident on the lens, i.e., a phase of a signal component corresponding to an individual direction, it is required that an appropriate phase mask is applied to the lens. Hereinafter, a lens design scheme for controlling a signal gain for a multi-beam will be described with reference to FIGS. 10A to 12C.

Figure 10A:
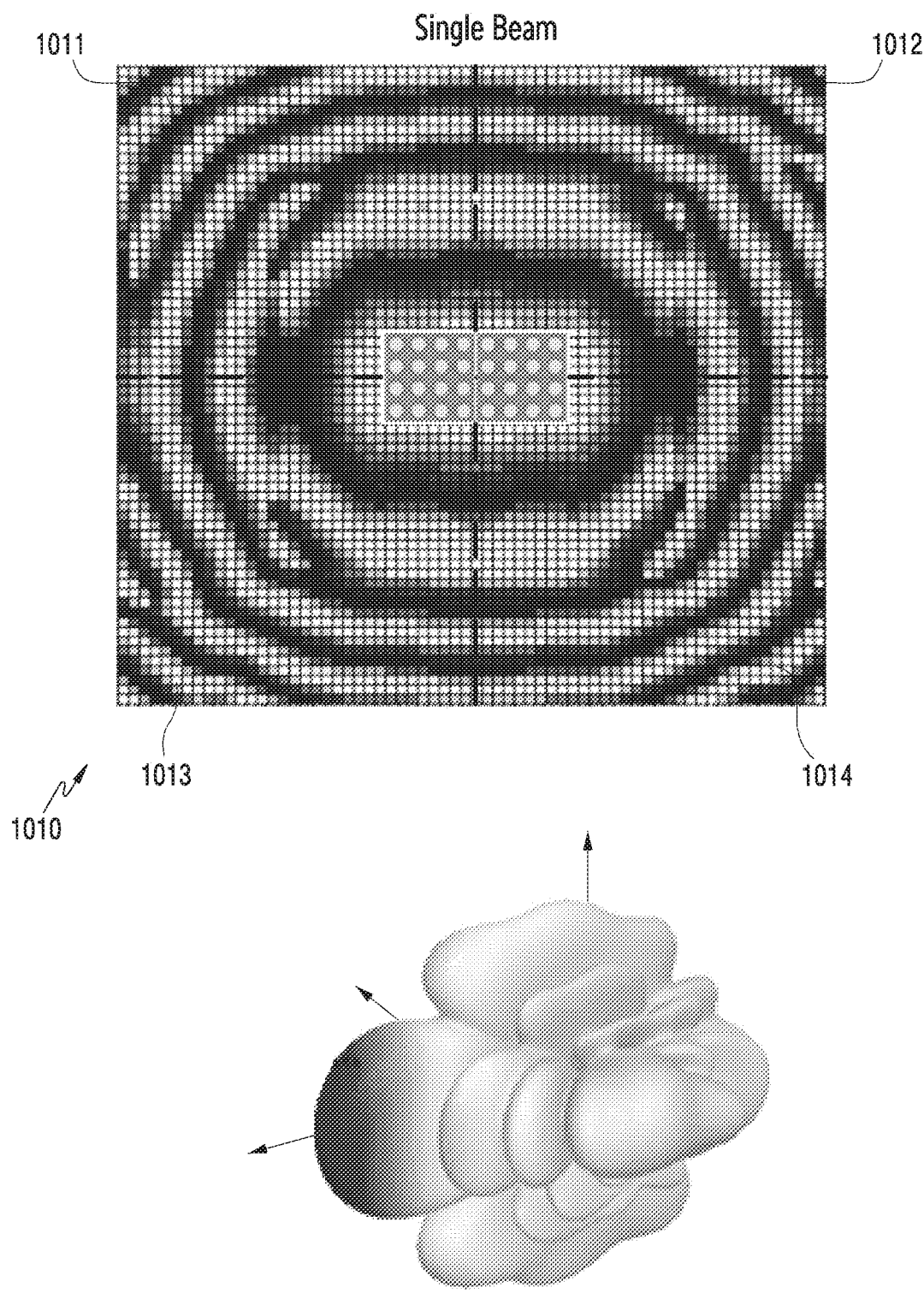
FIGS. 10A, 10B and 10C illustrate examples of projection form of a lens according to a beam shape in a wireless communication system according to embodiments of the disclosure.
Figure 10B:
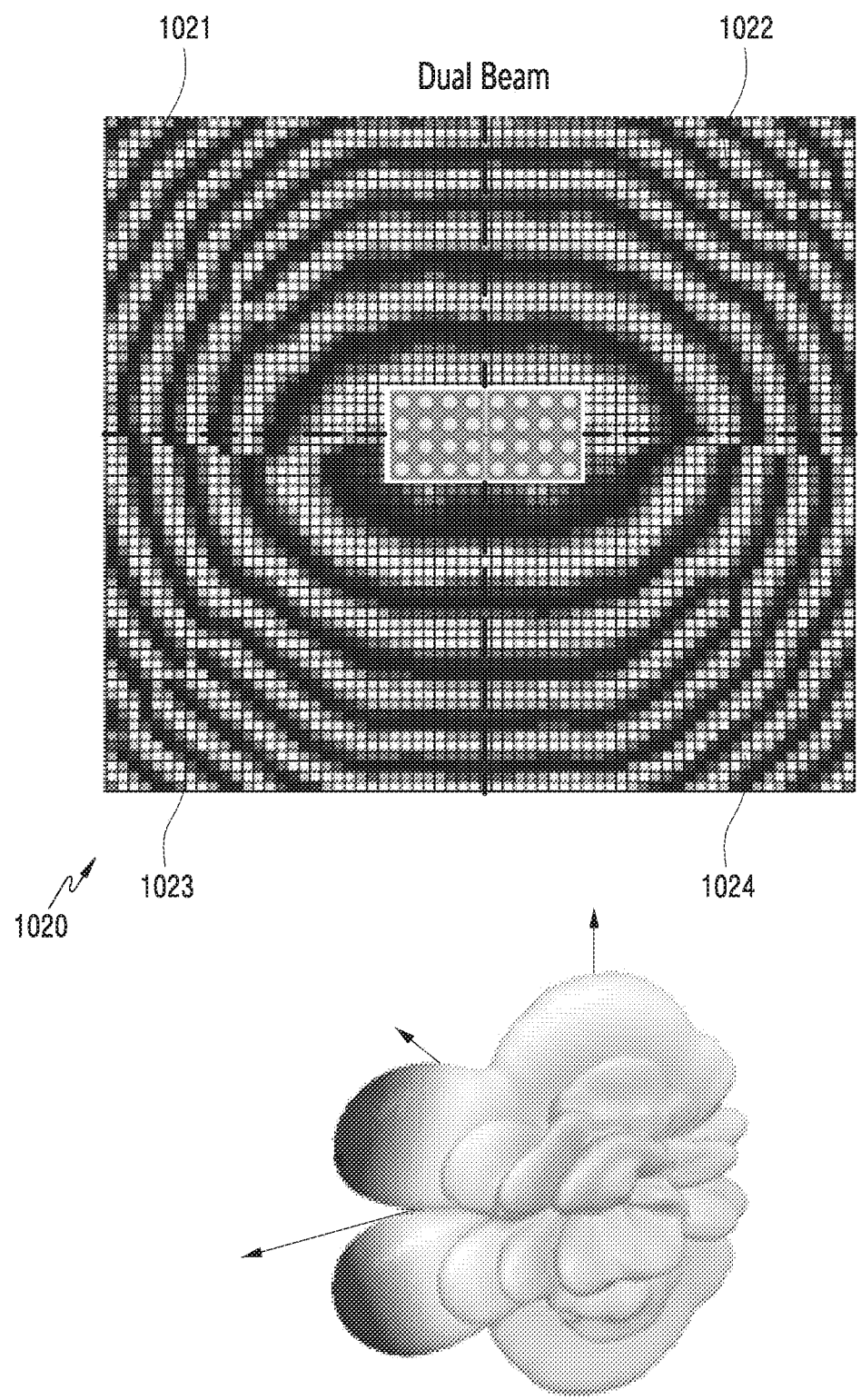
Figure 10C:
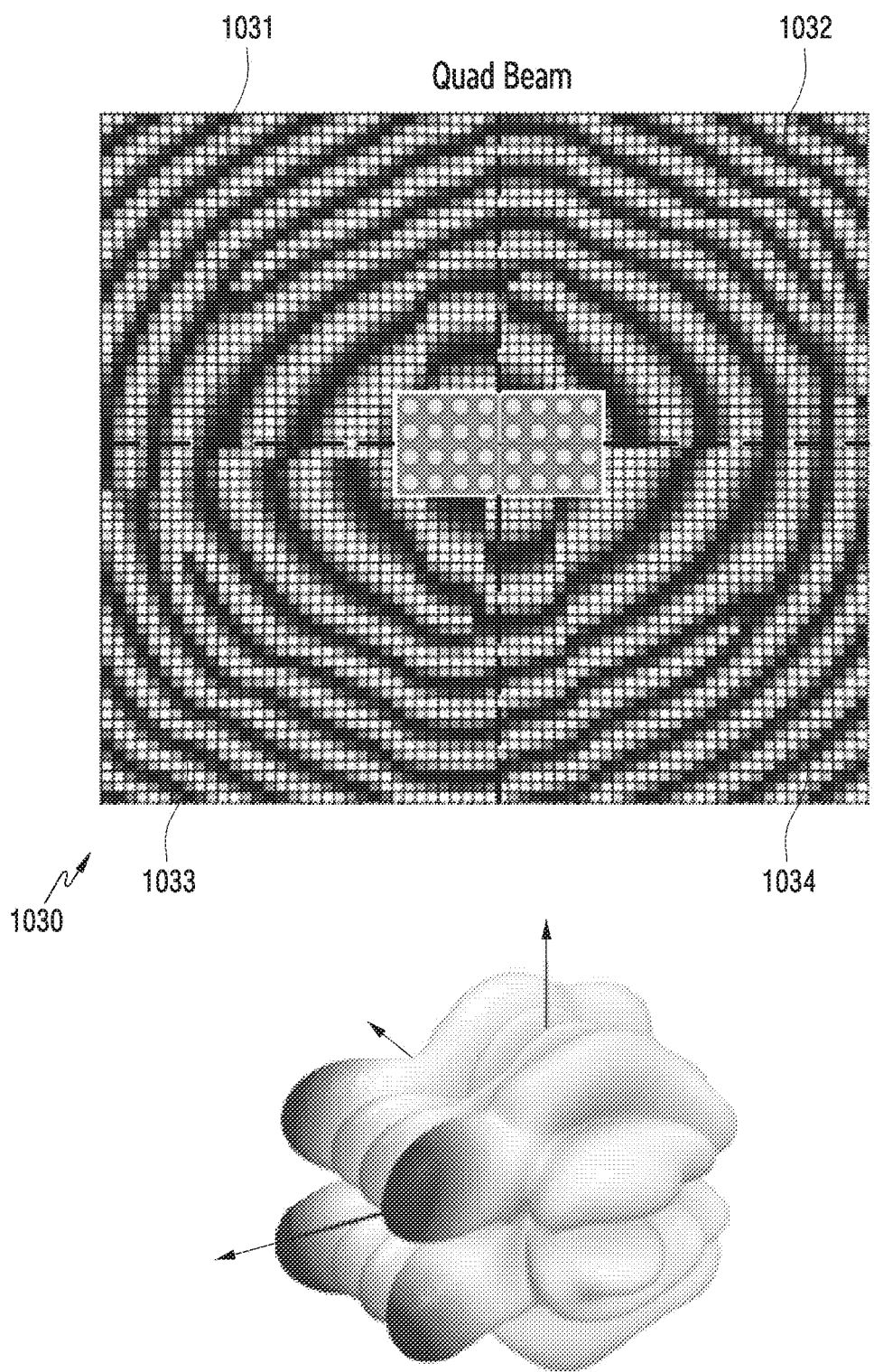

FIGS. 10A, 10B and 10C illustrate examples of a projection form of a lens according to a beam shape in a wireless communication system according to embodiments of the disclosure.

Referring to FIG. 10A, a single beam is projected onto the lens. A signal is emitted using the single beam from an antenna array, and the signal incident on the lens may be projected onto the lens in the same form as that of a first projection surface 1010. The first projection surface 1010 includes a first quadrant 1011, a second quadrant 1012, a third quadrant 1013, and a fourth quadrant 1014. As the single beam is incident on the lens, the first quadrant 1011, the second quadrant 1012, the third quadrant 1013, and the fourth quadrant 1014 may all be mutually symmetrical. The first projection surface 1010 may include four symmetry surfaces. That is, mutual phase differences between signal components incident on corresponding positions in the first quadrant 1011, the second quadrant 1012, the third quadrant 1013, and the fourth quadrant 1014 may be absent or close to 0 degrees. The first projection surface 1010 does not include an asymmetric quadrant.

Referring to FIG. 10B, a dual-beam is projected onto a lens. A signal is emitted from an antenna array by using a dual-beam, and the signal incident on the lens may be projected onto the lens in the same form as that of a second projection surface 1020. The second projection surface 1020 includes a first quadrant 1021, a second quadrant 1022, a third quadrant 1023, and a fourth quadrant 1024. As the dual-beam is incident on the lens, the first quadrant 1021 and the second quadrant 1022 may be symmetrical with the third quadrant 1023 and the fourth quadrant 1024. That is, a signal component incident on a first position of the first quadrant 1021 may have a phase value different from that of a signal component incident on a position in the third quadrant 1023 or the fourth quadrant 1024, which corresponds to the first position. For example, there is a phase difference of about 180 degrees between the signal component of the first position in the first quadrant 1021 and the signal component of the position in the third quadrant 1023, which corresponds to the first position. There is also a phase difference of about 180 degrees between the signal component of the first position in the first quadrant 1021 and the signal component of the position in the fourth quadrant 1024, which corresponds to the first position. A phase difference of the signal components between the corresponding positions in the first quadrant 1021 and the second quadrant 1022 may be absent or close to 0 degrees. The second projection surface 1020 includes asymmetric quadrants, such as the first quadrant 1021 and the fourth quadrant 1024 or the second quadrant 1022 and the third quadrant 1023.

FIG. 10C shows that a quad-beam is projected onto a lens. A signal is emitted from an antenna array by using a quad-beam, and the signal incident on the lens may be projected onto the lens in the same form as that of a third projection surface 1030. The third projection surface 1030 includes a first quadrant 1031, a second quadrant 1032, a third quadrant 1033, and a fourth quadrant 1034. As the quad-beam is incident on the lens, the first quadrant 1031 may be symmetrical with the third quadrant 1033. The first quadrant 1031 may be asymmetric with the second quadrant 1032 and the fourth quadrant 1034. Likewise, the second quadrant 1032 may be symmetric with the fourth quadrant 1034. The second quadrant 1032 may be asymmetric with the first quadrant 1031 and the fourth quadrant 1034. The first quadrant 1031 may have a phase value different from that of the second quadrant 1032 or the fourth quadrant 1034. For example, there is a phase difference of about 180 degrees between a signal component of a second position in the first quadrant 1031 and a signal component of a position in the second quadrant 1032, which corresponds to the second position. There is also a phase difference of about 180 degrees between the signal component of the second position in the first quadrant 1031 and a signal component of a position in the fourth quadrant 1034, which corresponds to the second position. A phase difference between the signal component of the second position in the first quadrant 1031 and a signal component of a position in the third quadrant 1033, which corresponds to the second position may be absent or close to 0 degrees.

The lens may include unit cells, and each unit cell may include a dielectric substrate and a conductor unit. The dielectric substrate may include a dielectric, and the conductor unit may include metal. Each unit cell may delay a phase of an incident signal. A phase of the signal incident on the lens, that is, a phase of each of signal components incident on the unit cells, is converted to in-phase so that a gain of a signal transmitted to a wireless channel increases. The incident signal components are converted on the basis of a phase profile for the lens and a phase profile for a beam of the incident signal components, and then emitted from the lens. The phase profile for the lens may be information on a phase shift value of each of the unit cells included in the lens.

Depending on the shape of a beam provided in the antenna array, a phase pattern projected onto the lens is different. According to embodiments, there exists an asymmetrical surface among the quadrants in the case of forming a multi-beam. In order to control phase conversion in the asymmetric surfaces of the area where the multi-beam is projected on the lens, a method of disposing the unit cells in the lens for multi-beamforming is required. Hereinafter, with reference to FIG. 11, a unit cell according to embodiments will be described.

Figure 11:
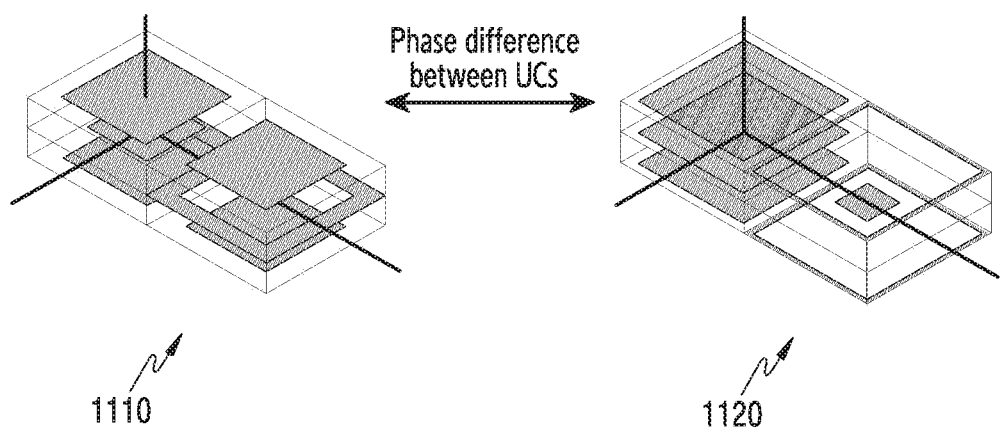
FIG. 11 illustrates an example of a unit cell for designing a multi-beamforming-based lens in a wireless communication system according to an embodiment of the disclosure.

FIG. 11 illustrates an example of a unit cell for designing a multi-beamforming-based lens in a wireless communication system according to an embodiment of the disclosure. As described in FIGS. 10A to 10C, examples of unit cells for controlling mutually different phases in asymmetric surfaces are illustrated.

Referring to FIG. 11, a lens according to embodiments may include first unit cell 1110 and a second unit cell 1120. Each of the first unit cell 1110 and the second unit cell 1120 may include a dielectric substrate and a conductor unit. The dielectric substrate may include a dielectric, and the conductor unit may include metal. Each of the first unit cell 1110 and the second unit cell 1120 may delay phases of incident signal components, respectively. The first unit cell 1110 may be configured to provide a first dielectric rate through metal and a dielectric of the first unit cell 1110. Likewise, the second unit cell 1120 may be configured to provide a second dielectric rate through metal and a dielectric of the second unit cell 1120.

The magnitudes of phases delayed by the first unit cell 1110 and the second unit cell 1120 may be different. That is, a difference between a phase shift value of the first unit cell 1110 and a phase shift value of the second unit cell 1120 may not be zero. A phase delay provided via the first dielectric rate may be different from a phase delay provided via the second dielectric rate. According to embodiments, there exists a phase difference of about 180 degrees between the first unit cell 1110 and the second unit cell 1120. For example, about 180 degrees may refer to an angle within an error range of 5 degrees on the basis of 180 degrees. For another example, about 180 degrees may refer to an angle within an error range of 1 degree on the basis of 180 degrees. The first unit cell 1110 may cause a phase of the signal component incident on the first unit cell 1110 to be 180 degrees faster or may delay the same by 180 degrees relative to a phase of the signal component incident on the second unit cell 1120.

In order to convert, to in-phase, phases of respective signal components of the signal emitted through multi-beamforming, the lens is required to include unit cells that provide various phase shift values. According to embodiments, the lens may be designed to include unit cells that provide a phase difference of 180 degrees. As illustrated in FIGS. 10A to 10C, an arrangement pattern of unit cells having different phase shift values according to a pattern of signal components projected onto the lens is required.

In FIG. 11, a rectangular loop or a rectangular patch is illustrated as a conductor unit, but unit cells of various shapes, such as triangular, pentagonal, and circular shapes, may be applied to the lens of the disclosure. In FIG. 11, the phase difference of 180 degrees is described as an example, but the disclosure is not limited thereto. As a multi-beam, when a multi-beam other than a dual-beam or a quad-beam is formed, unit cells, in which phase differences having magnitudes other than 180 degrees, may be used.

Figure 12A:
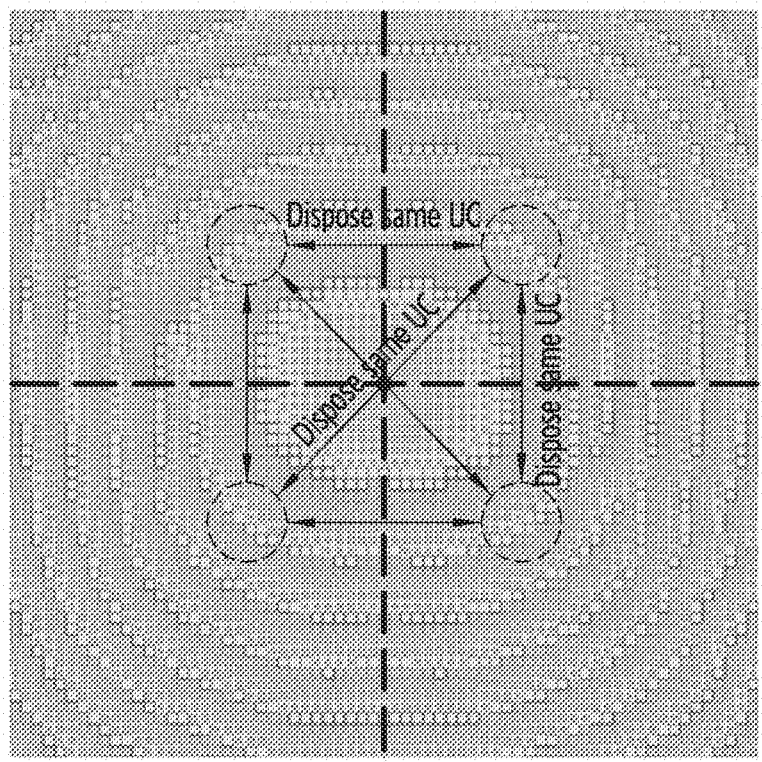
FIGS. 12A, 12B and 12C illustrate examples of designs of multi-beamforming-based lenses in a wireless communication system according to embodiments of the disclosure.
Figure 12B:
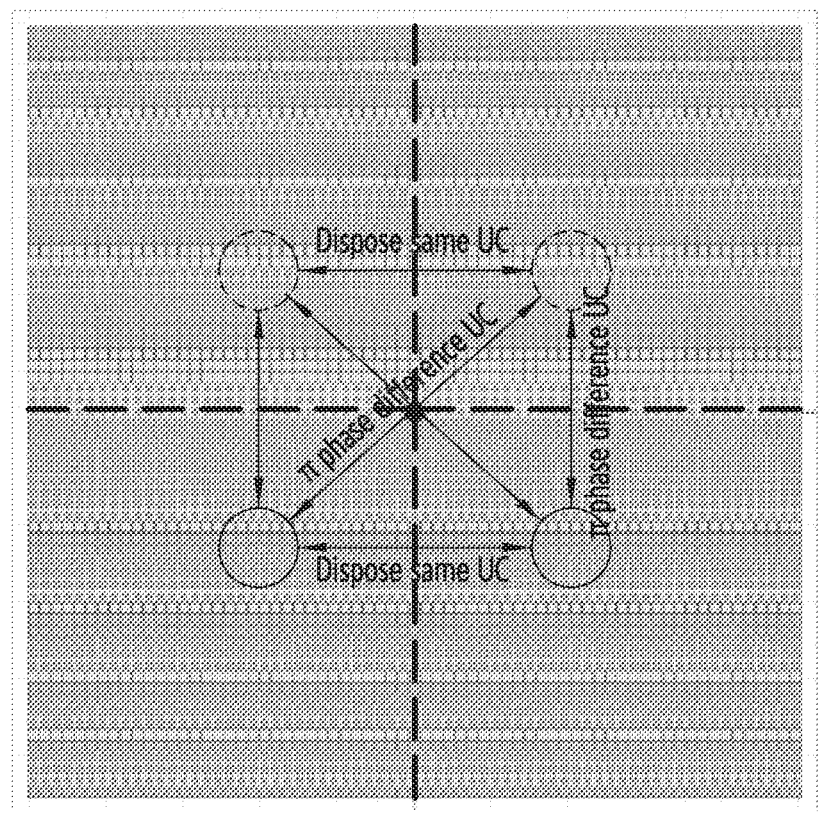
Figure 12C:
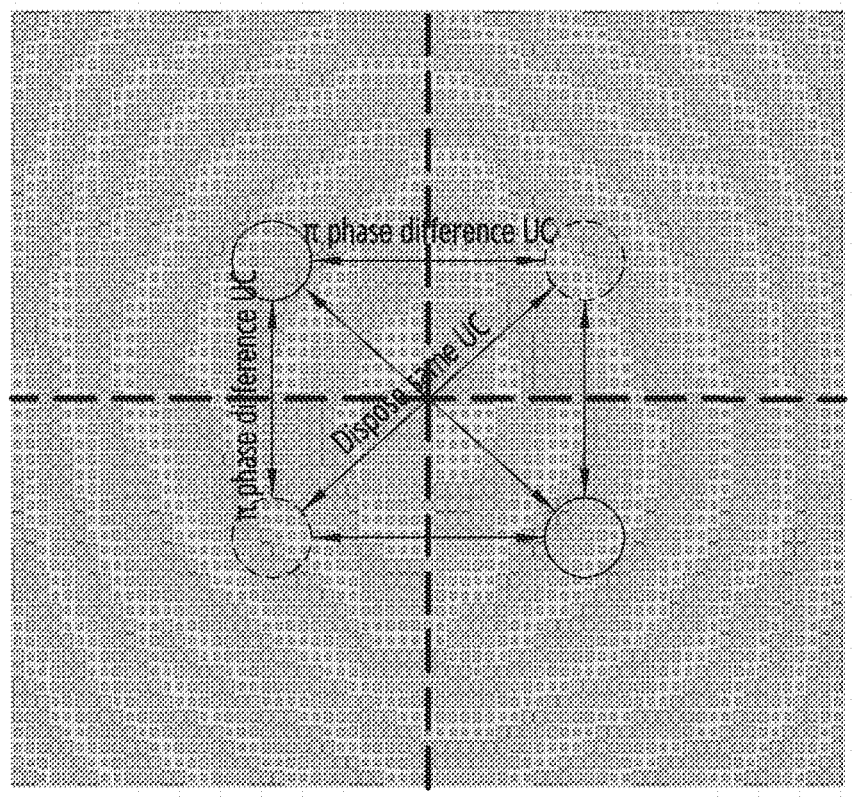

FIGS. 12A, 12B and 12C illustrate examples of designs of multi-beamforming-based lenses in a wireless communication system according to embodiments of the disclosure. Examples of design of three lenses are shown in FIGS. 12A to 12C. On the basis of comparison with a scheme for a single beam, a scheme of designing a lens for a multi-beam according to embodiments is described.

Referring to FIG. 12A, a first design scheme 1210 indicates a scheme of designing a single beam-based lens. As illustrated in FIG. 10A, because all four quadrants of a projection surface on the lens are symmetrical, a single beam-based lens may include unit cells with no phase difference in each quadrant. That is, the unit cells arranged at mutually symmetric positions in each quadrant provide the same phase shift value. Arrangement of the unit cells on an area indicated by dotted lines represents arrangement of unit cells that provide the same phase shift value.

Referring to FIG. 12B, a second design scheme 1220 indicates a scheme of designing a dual-beam-based lens. As illustrated in FIG. 10B, a first quadrant and a second quadrant of four quadrants of projection surfaces on the lens may be symmetrical with a third quadrant and a fourth quadrant. That is, the four quadrants of the dual-beam based lens may form line symmetry with respect to the lens center. Arrangement of the unit cells on an area indicated by dotted lines represents arrangement of unit cells that provide the same phase shift value. Likewise, arrangement of the unit cells on an area indicated by solid lines represents arrangement of unit cells that provide the same phase shift value.

The dual-beam-based lens may include unit cells without phase differences at corresponding positions of the symmetric quadrants. The dual-beam-based lens may be designed so that unit cells having no phase difference at the corresponding positions of the symmetric quadrants are arranged. For example, unit cells arranged at symmetrical positions between the first quadrant and the second quadrant of the dual-beam-based lens may provide the same phase transition value. Further, unit cells arranged at symmetrical positions between the third quadrant and the fourth quadrant of the dual-beam-based lens may provide the same phase transition value.

The dual-beam-based lens may include unit cells having phase differences at corresponding positions of asymmetric quadrants. The dual-beam-based lens may be designed so that unit cells having phase differences at the corresponding positions of the asymmetric quadrants are arranged. For example, unit cells arranged at symmetrical positions between the first quadrant and the fourth quadrant of the dual-beam-based lens may provide mutually different phase transition values, i.e., a phase transition value of about 180 degrees (i.e., t radian). Further, unit cells arranged at symmetrical positions between the second quadrant and the third quadrant of the dual-beam-based lens may provide mutually different phase transition values, i.e., a phase transition value of about 180 degrees. In FIG. 12B, the phase difference between a unit cell in an area indicated by a dotted line and a unit cell in an area indicated by a solid line may be about 180 degrees.

Referring to FIG. 12C, a third design scheme 1230 indicates a scheme of designing a quad-beam-based lens. As illustrated in FIG. 10C, a first quadrant among four quadrants of projection areas on the lens may be symmetrical with a third quadrant. The first quadrant may be asymmetric with a second quadrant and a fourth quadrant. Likewise, the second quadrant may be symmetric with the fourth quadrant. The second quadrant may be asymmetric with the first quadrant and the third quadrant. That is, the four quadrants of the quad-beam based lens may form point symmetry with respect to the lens center. Arrangement of the unit cells on an area indicated by dotted lines represents arrangement of unit cells that provide the same phase shift value. Likewise, arrangement of the unit cells on an area indicated by solid lines represents arrangement of unit cells that provide the same phase shift value.

The quad-beam-based lens may include unit cells having no phase differences at corresponding positions of the symmetric quadrants. The quad-beam-based lens may be designed so that unit cells having no phase difference at the corresponding positions of the symmetric quadrants are arranged. For example, unit cells arranged at symmetrical positions between the first quadrant and the third quadrant of the quad-beam-based lens may provide the same phase transition value. Further, unit cells arranged at symmetrical positions between the second quadrant and the third quadrant of the quad-beam-based lens may provide the same phase transition value.

The quad-beam-based lens may include unit cells having phase differences at corresponding positions of asymmetric quadrants. The quad-beam-based lens may be designed so that unit cells having phase differences at the corresponding positions of the asymmetric quadrants are arranged. For example, unit cells arranged at symmetrical positions between the first quadrant and the second quadrant (or the fourth quadrant) of the quad-beam-based lens may provide mutually different phase transition values, i.e., a phase transition value of about 180 degrees (i.e., t radian). Further, unit cells arranged at symmetrical positions between the second quadrant and the third quadrant of the quad-beam-based lens may provide mutually different phase transition values, i.e., a phase transition value of about 180 degrees. In FIG. 12C, the phase difference between a unit cell in an area indicated by a dotted line and a unit cell in an area indicated by a solid line may be about 180 degrees.

Implementation of the disclosure may be identified as an arrangement condition of unit cells constituting the lens is changed with respect to the lens center. The presence or absence of multi-beam utilization may be determined by the unit cell arrangement shape. Depending on the phase difference between the unit cells arranged in symmetrical positions in the quadrant, whether the lens design scheme of the disclosure has been implemented may be determined. For example, when the phase difference between the unit cells arranged in symmetrical positions between the first quadrant and fourth quadrant is about 180 degrees, whether the design scheme of the lens (e.g., a quad-beam-based lens) of the disclosure may be determined. For another example, when the phase difference between the unit cells arranged in symmetrical positions between the first quadrant and second quadrant is about 180 degrees, whether the design scheme of the lens (e.g., a dual-beam-based lens) of the disclosure may be determined.

FIGS. 12A, 12B and 12C have described schemes of design by varying arrangement of unit cells according to shapes of beams emitted from an antenna array, but the disclosure is not limited thereto. Phase values provided by unit cells of a lens may be variably adjusted, or a plurality of combinations of the unit cells according to shapes of the plurality of beams may be arranged in the lens. According to embodiments, a beamforming device may adaptively apply a phase mask to each of the unit cells in the lens in response to the shapes of the beams provided by the antenna array. Further, according to embodiments, the beamforming device may include multiple lenses corresponding to the respective shapes of the beams, may adaptively identify unit cell areas according to the shapes of the beams formed in the antenna array, and may transmit a signal.

According to embodiments, projection areas on the lens may be increased via a scheme of forming a beam in an antenna array, i.e., multi-beamforming Due to the area difference of the projection areas, the amount of gain variation to be improved varies. Further, by control of the beamforming-based lens according to embodiments, an improved effect of signal gain control due to the lens is provided by performing phase conversion of each signal component in the projection area that has been increased via multi-beamforming.

By controlling both a distance between the antenna array and the lens, and the shape of the beams generated at the time of beamforming, it may be possible to design the lens-based beamforming device in a form that is more free of physical constraints. It may be possible to miniaturize (e.g., 16λ×20λ×5λ at 23.2λ×23.2λ×26.5λ) the beamforming device. Further, it may be determined that azimuth coverage (e.g., ±13° at ±17°) is changed by controlling the gain of the signal using multi-beamforming through the lens, and/or the gain of beamforming through the lens is increased due to a change in elevation coverage (e.g., ±10° at ±12°).

According to embodiments in the disclosure, the beamforming device forms a plurality of beams (in other words, multi-beam). To form the plurality of beams in one emission instance (one time, simultaneously, or concurrently), phase values according to the phase pattern have a phase difference. The phase difference is usable for forming at least one area in which phases are canceled out (or offset, be negated). By forming the multi-bema, the areas projected on the lens can be increased and the beamforming efficiency of lens is improved.

Methods according to embodiments stated in claims and/or specifications of the disclosure may be implemented using hardware, software, or a combination of hardware and software.

When the methods are implemented using software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other types of optical storage devices, or a magnetic cassette. Alternatively, any combination of some or all of the above may form a memory in which programs and/or data is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and embodiments of the disclosure are not limited to a single element or multiple elements thereof. Further, multiple elements expressed in the description may be configured into a single element or a single element in the description may be configured into multiple elements.

While the disclosure has been shown and described with reference to embodiments thereof, it will be understood by those skilled in the art that various changes in form and detail may be made therein without departing from the spirit and scope of the disclosure as defined by the appended claims and their equivalents.

What is claimed is:

1. A beamforming device in a wireless communication system, the beamforming device comprising:
   an antenna array;
   at least one transceiver configured to perform beamforming based on applying a phase pattern for forming a plurality of beams; and
   a lens for applying phase shift values corresponding to the phase pattern, wherein the lens includes unit cells and is configured to:
      adjust a phase of signals incident on the lens based on the phase shift values, and
      emit output signals based on the phase of the signals incident on the lens,
   wherein two groups in the phase shift values have a phase difference for forming at least one area in which gains of the output signals are increased.

2. The beamforming device of claim 1,
   wherein the phase pattern include a first phase value for antenna elements in a first column of the antenna array and a second phase value for antenna elements of a second column of the antenna array,
   wherein the first column is symmetrical to the second column with respect to a center of the antenna array, and
   wherein a difference between the first phase value and the second phase value is greater than 179 degrees and smaller than 181 degrees.

3. The beamforming device of claim 1,
   wherein the incident signals include signal components emitted using the plurality of beams, and
   wherein the lens include a plurality of projected areas, each of the plurality of projected areas corresponding to an intensity of a signal component that is equal to or greater than a particular intensity.

4. The beamforming device of claim 1,
   wherein the pattern of the unit cells includes phase shift values, and
   wherein the lens is further configured to adjust phases of the incident signals based on the phase shift values and phase profiles for the incident signals.

5. The beamforming device of claim 4,
   wherein the phase shift values include a first phase shift value and a second phase shift value, and
   wherein a difference between the first phase shift value and the second phase shift value is greater than 179 degrees and smaller than 181 degrees.

6. The beamforming device of claim 4,
wherein a phase shift value of a first unit cell disposed at a first position of a first quadrant of the lens comprises a value equal to a phase shift value of a second unit cell in a second quadrant of the lens, which is disposed at a position corresponding to the first position, or has a difference of greater than −1 degree and smaller than 1 degree from the phase shift value of the second unit cell, and
wherein the value has a difference of greater than 179 degrees and smaller than 181 degrees from a phase shift value of a third unit cell in a third quadrant or a fourth quadrant of the lens, which is disposed at a position corresponding to the first position.

7. The beamforming device of claim 4,
wherein a phase shift value of a fourth unit cell disposed at a second position of a first quadrant of the lens comprises a value that has a difference of greater than 179 degrees and smaller than 181 degrees from a phase shift value of a fifth unit cell in a second quadrant or a fourth quadrant of the lens, which is disposed at a position corresponding to the second position, and
wherein the value is equal to a phase shift value of a sixth unit cell in a third quadrant of the lens, which is disposed at a position corresponding to the second position, or has a difference of greater than −1 degree and smaller than 1 degree from the phase shift value of the sixth unit cell.

8. A method performed by a beamforming device in a wireless communication system, the method comprising:
performing, by a transceiver, beamforming based on applying a phase pattern for forming a plurality of beams;
adjusting, by a lens, a phase of signals incident on the lens based on phase shift values, the phase shift values corresponding to the phase pattern; and
emitting, by the lens, output signals based on the phase of the signals incident on the lens,
wherein the lens includes unit cells and is configured to apply the phase shift values, and
wherein two groups in the phase shift values have a phase difference for forming at least one area in which gains of the output signals are increased.

9. The method of claim 8,
wherein the phase pattern include a first phase value for antenna elements in a first column and a second phase value for antenna elements of a second column,
wherein the first column is symmetrical to the second column with respect to a center, and
wherein a difference between the first phase value and the second phase value is greater than 179 degrees and smaller than 181 degrees.

10. The method of claim 8,
wherein the incident signals include signal components emitted using the plurality of beams, and
wherein the lens include a plurality of projected areas, each of the plurality of projected areas corresponding to an intensity of a signal component that is equal to or greater than a particular intensity.

11. The method of claim 8,
wherein the pattern of the unit cells includes phase shift values, and
wherein the method further comprises adjusting phases of the incident signals based on the phase shift values and phase profiles for the incident signals.

12. The method of claim 11,
wherein the phase shift values include a first phase shift value and a second phase shift value, and
wherein a difference between the first phase shift value and the second phase shift value is greater than 179 degrees and smaller than 181 degrees.

13. The method of claim 11,
wherein a phase shift value of a first unit cell disposed at a first position of a first quadrant of the lens comprises a value that is equal to a phase shift value of a second unit cell in a second quadrant of the lens, which is disposed at a position corresponding to the first position, or has a difference of greater than −1 degree and smaller than 1 degree from the phase shift value of the second unit cell, and
wherein the value has a difference of greater than 179 degrees and smaller than 181 degrees from a phase shift value of a third unit cell in a third quadrant or a fourth quadrant of the lens, which is disposed at a position corresponding to the first position.

14. The method of claim 11,
wherein a phase shift value of a fourth unit cell disposed at a second position of a first quadrant of the lens comprises a value that has a difference of greater than 179 degrees and smaller than 181 degrees from a phase shift value of a fifth unit cell in a second quadrant or a fourth quadrant of the lens, which is disposed at a position corresponding to the second position, and
wherein the value is equal to a phase shift value of a sixth unit cell in a third quadrant of the lens, which is disposed at a position corresponding to the second position, or has a difference of greater than −1 degree and smaller than 1 degree from the phase shift value of the sixth unit cell.

15. The beamforming device of claim 1,
wherein each of the unit cells has a unique characteristic,
wherein the unique characteristic includes at least one of a material, size, or shape.

16. The method of claim 8,
wherein each of the unit cells has a unique characteristic,
wherein the unique characteristic includes at least one of a material, size, or shape.

\* \* \* \* \*